United States Patent [19]

Hosaka et al.

[11] Patent Number: 4,839,699

[45] Date of Patent: Jun. 13, 1989

[54] IMAGE REPRODUCING APPARATUS

[75] Inventors: Masao Hosaka, Sagamihara; Takashi Saito, Ichikawa, both of Japan

[73] Assignee: Canon Kabushiki Kaisha, Tokyo, Japan

[21] Appl. No.: 132,663

[22] Filed: Dec. 10, 1987

Related U.S. Application Data

[63] Continuation of Ser. No. 891,463, Jul. 31, 1986, abandoned.

[30] Foreign Application Priority Data

| | | | |
|---|---|---|---|
| Jul. 31, 1985 | [JP] | Japan | 60-167695 |
| Jul. 31, 1985 | [JP] | Japan | 60-167696 |
| Jul. 31, 1985 | [JP] | Japan | 60-167697 |
| Jul. 31, 1985 | [JP] | Japan | 60-167698 |

[51] Int. Cl.⁴ .......... G03B 27/52

[52] U.S. Cl. .......... 355/55; 355/57; 355/243

[58] Field of Search .......... 355/7, 77, 14 R, 55, 355/57, 14 CU, 40

[56] References Cited

U.S. PATENT DOCUMENTS

| | | | |
|---|---|---|---|
| 3,490,844 | 1/1970 | Sapp, Jr. | 355/77 X |
| 4,120,578 | 10/1978 | Daniels et al. | 355/57 X |
| 4,209,248 | 6/1980 | Gibson et al. | 355/57 X |
| 4,417,805 | 11/1983 | Kishi | 355/7 X |
| 4,593,999 | 6/1986 | Adachi et al. | 355/55 |
| 4,598,994 | 7/1986 | Tomosada et al. | 355/14 R |
| 4,623,216 | 11/1986 | Sato et al. | 350/6.5 |
| 4,720,729 | 1/1988 | Watanabe | 355/7 X |

*Primary Examiner*—Richard A. Wintercorn

[57] ABSTRACT

An image recording apparatus comprising a device for setting the magnification-changing mode of an image, a device for changing the magnification of the image in accordance with the setting device, and a device for controlling the magnification-changing setting device to change the magnification of a part of the image at a magnification-changing ratio different from another part thereof and to continuously reproduce such a magnification-changed image.

11 Claims, 32 Drawing Sheets

IMAGE REPRODUCING APPARATUS

This application is a continuation of application Ser. No. 891,463 filed July 31, 1986, now abandoned.

BACKGROUND OF THE INVENTION

1. Field of the Invention

This invention relates to an image reproducing apparatus, and, more particularly, it is concerned with an apparatus for reproducing a series of images with varied magnification.

2. Related Background Art

With progress in office-automation in recent years, remarkable development has been attained in the size-reduction and multi-functionalization in reproducing apparatuses. As the consequence of this, even small-sized reproduction apparatuses are equipped with an appropriate magnification-varying mechanism so as to meet various needs of users in general.

The change in magnification to be performed in this type of reproduction apparatus is accomplished by varying the velocity ratio of an optical motor for driving an optical scanning system for reading an image original and a main motor for driving a photosensitive drum system so as to obtain an image on a reduced scale or an image on an enlarged scale. For instance, in an image reproduction apparatus of an image original table moving type, the moving velocity of the image original table is made greater than that of the photosensitive drum (at a constant velocity) to reduce the scale of the reproduced image, or the moving velocity of the image original table is made less than that of the drum to thereby enlarge the scale of the reproduced image.

As such, the conventional reproduction apparatuses produce a life-size image, an enlarged scale image, and a reduced scale image by maintaining a constant magnification-varying ratio during a single image forming operations. With such conventional reproduction apparatuses, however, when the magnification-varying ratio is constant, various images on the original will be enlarged or reduced at a constant ratio. This can lead to difficulties in the image editing process, and particularly when image lay-out is performed for design purposes. In such image lay-out, various patterns are often laid-out by the intentional combination of one image in one pattern in various scales. However, difficulty would inevitably arise in the editorial work to be done satisfactorily, because, for example, the image is converted into electrical signals as in a laser printer to obtain a reproduced image in a desired magnification, or a single image is subjected to a magnification change some number of times. Thereafter the thus obtained images in various magnifications are clipped and attached onto desired positions on a sheet to thereby prepare an original design sheet, which is further reproduced on a life-size scale to prepare a desired edition of the image. Such editorial work is extremely complicated, and also wastes a large amount of paper.

Further, when forming an image on a reduced scale, the conventional reproduction apparatuses are disadvantageous on that, when the image in a reduced scale spreads out beyond the edge of recording paper of regular sizes such as A4, A3, and B4 sizes, a large blank area would be formed in a single sheet of recording paper with the consequence that, when a large quantity of such images of reduced size are required a larger amount of recording paper would be needed than the number of recording paper primarily required; hence there would be a considerable increase in the cost for the office supplies.

SUMMARY OF THE INVENTION

It is therefore the primary object of the present invention to provide an image reproducing apparatus free from the aforedescribed disadvantages.

It is another object of the present invention to provide an image forming apparatus capable of outputting images with remarkable effect in their design aspect, wherein these images have been subjected to stepwise magnification-changing.

It is still another object of the present invention to provide an image reproducing apparatus capable of obtaining images in various magnifications in series without the necessity for considerably changing the construction of the reproducing apparatus.

It is another object of the present invention to provide an image reproducing apparatus capable of outputting images ranging from those with high design effect by their successive magnification-changing to those with a fixed ratio of magnification-changing.

It is still another object of the present invention to provide an image forming apparatus capable of easily forming a plurality of deformed images from one and the same image original depending on necessity.

It is further object of the present invention to provide an image processing apparatus capable of executing arbitrarily, on a single image original, several magnification-changing and scattered images to move in one and the same direction, or of executing easily an edited image from which a blank space is deleted.

It is still a further object of the present invention to provide an image forming apparatus capable of forming a blank by positioning those images with varied magnifications closer together so as to form a required image on a single sheet.

It is an additional object of the present invention to provide an image forming apparatus capable of adequately forming a required image alone out of the image original on one and the same recording paper or on a display screen.

The foregoing objects, and other objects as well as the specific construction and function of the image reproducing apparatus according to the present invention will become more apparent and understandable from the following detailed description thereof, when read in conjunction with the accompanying drawing.

DETAILED DESCRIPTION OF THE PREFERRED EMBODIMENTS

Figure 1A:
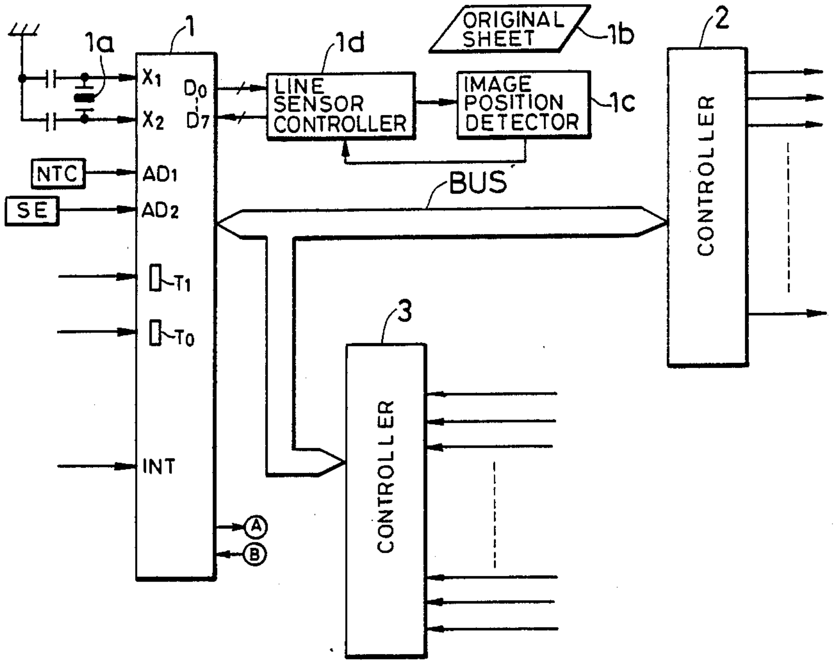
FIGS. 1A and 1B are control block diagrams for the image forming apparatus according to one embodiment of the present invention.
Figure 1B:
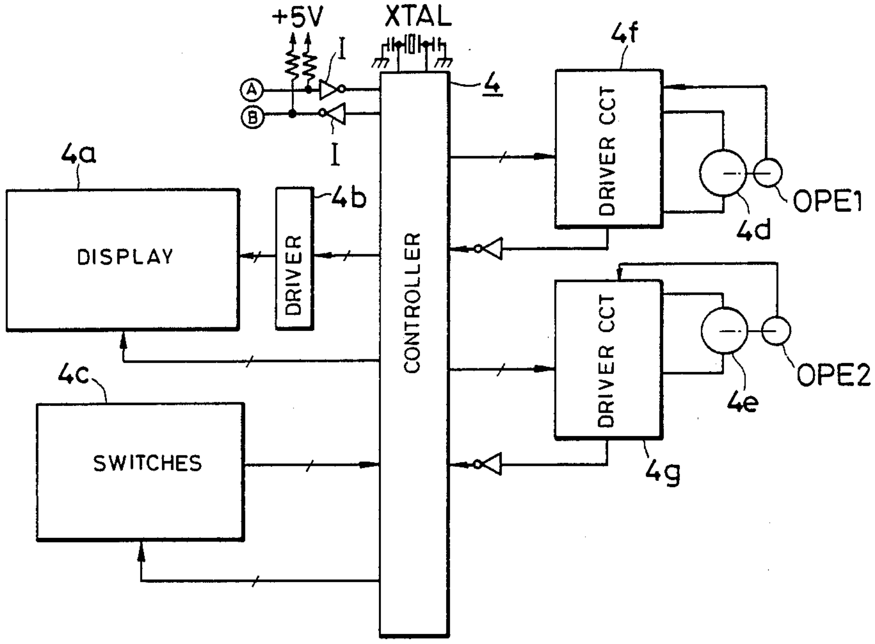

FIGS. 1A and 1B are the control block diagrams for the image forming apparatus according to one embodiment of the present invention, wherein reference numerals 1 to 4 are designate controllers, each of which is constructed with a micro-processor, etc. The controller 1 and the controller 4, a speed control means according to the present invention, are connected at A and B in the form of $\mu$-LAN (i.e., it is in the form of the serial communication through a TTL inverter I).

In FIG. 1A, the controller 1 receives at its terminals $X_1$ and $X_2$ clock signals of 11 MHz for example, from an oscillator 1*a*, and controls each of the controllers 2, 3 and 4 in synchronism with the clock signals. The controller 1 also receives at its data terminals $AD_1$ and $AD_2$ those outputs from a temperature sensor NTC of an image fixing device (to be described later) and a surface potential sensor SE of a photosensitive member (to be described later). An event counter $T_1$ incorporated in the controller 1 receives an input pulse produced by rotation of the main motor (to be described later) and a timing pulse. By counting the pulses, the copy sequence proceeds. Also, an event counter $T_0$ of the controller 1 receives a zero cross pulse from an AC input of a power source section (not shown). By detecting the zero cross pulse from the AC input, the on-off control of a heater for the image fixing device or a lamp of the image scanner is actuated to thereby reduce the stress to the applied load. It is also possible, by this zero cross pulse, to prepare a timer for determining a timing for the sequence control of the process load. Further, an interruption terminal INT of the controller 1 receives an input pulse from a power failure detection circuit to alert controller 1 an abnormal condition of the apparatus. A reference numeral 1*b* designates an image original or original sheet. An output from an image position detection means 1*c* (constructed, for example, with a photo-diode array or CCD and fiber array, etc.) is introduced as an input into 8-channel data terminals $D_0$ through $D_7$ by means of a well known line sensor controller 1*d*. Incidentally, a light converging lens may be used in place of the fiber array.

The controllers 2 and 3 are for expanding the input and output of the controller 1, both controllers 2 and 3 communicating with the controller 1 by means of an address BUS. The controller 2 functions principally to emti output signals to the load to be connected, while the controller 3 receives thereinto output signals from various sensors.

In FIG. 1B, a reference numeral 4*a* designates a display section, which is connected to the controller 4 through a driver 4*b*, and, depending on an input from the switching means, 4, an area magnification setting means according to the present invention, the controller 4 to be the speed control means sends out speed instructions to a DC scanner motor 4*d*, the scan-drive means, and a DC main motor 4*e*, a rotation-drive means, through drive circuits 4*f* and 4*g*.

Incidentally, optical encoders OPE 1 and 2 are respectively provided in the DC scanner motor 4*d* and DC main motor, whereby pulse signals are fed back to the drive circuits 4*f* and 4*g* in accordance with the driving quantity, thus effecting the stabilization control of the speed.

Figure 2:
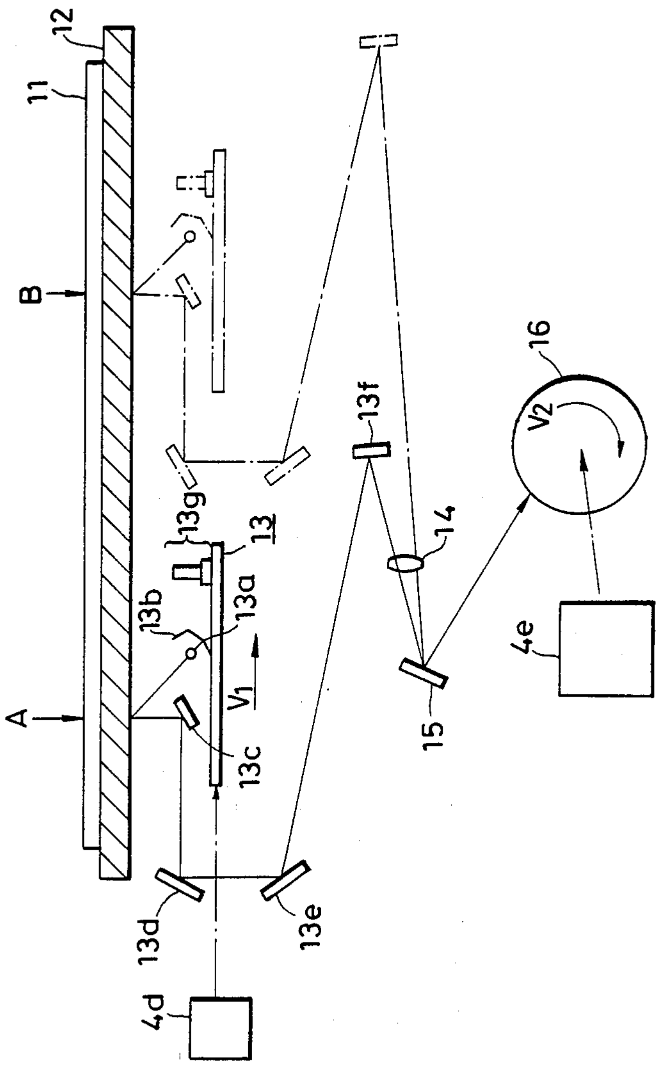
FIG. 2 is a schematic cross-sectional view of an image scanning section for explaining the driving operations of a DC scanner motor and a DC main motor shown in FIGS. 1A and 1B.

FIG. 2 is a cross-sectional view of the image scanning section for explaining the drive operation of the DC scanner motor 4*d* and the DC main motor 4*e*, wherein an image original 11 is placed on a glass table 12. A reference numeral 13 designates an image original scanning section, which is constructed with an exposure lamp 13*a* to expose the image original, a reflecting shade 13*d* to reflect light from the exposure lamp 13*a*, and scanning mirrors 13*c* to 13*f* to scan the reflected light of the exposure lamp 13*a*. The reflected light is projected sequentially onto the photosensitive drum 16 through the scanning mirrors 13*c* to 13*f*, an image-forming lens 14, and a scanning mirror 15. Incidentally, a reference letter A indicates an image scanning starting position, and B denotes an image scanning terminating position.

In the following, explanations will be made in reference to FIGS. 3 and 4 as to the stepwise magnification-changing (or variable-magnification) image forming operations according to the present invention.

Figure 3:
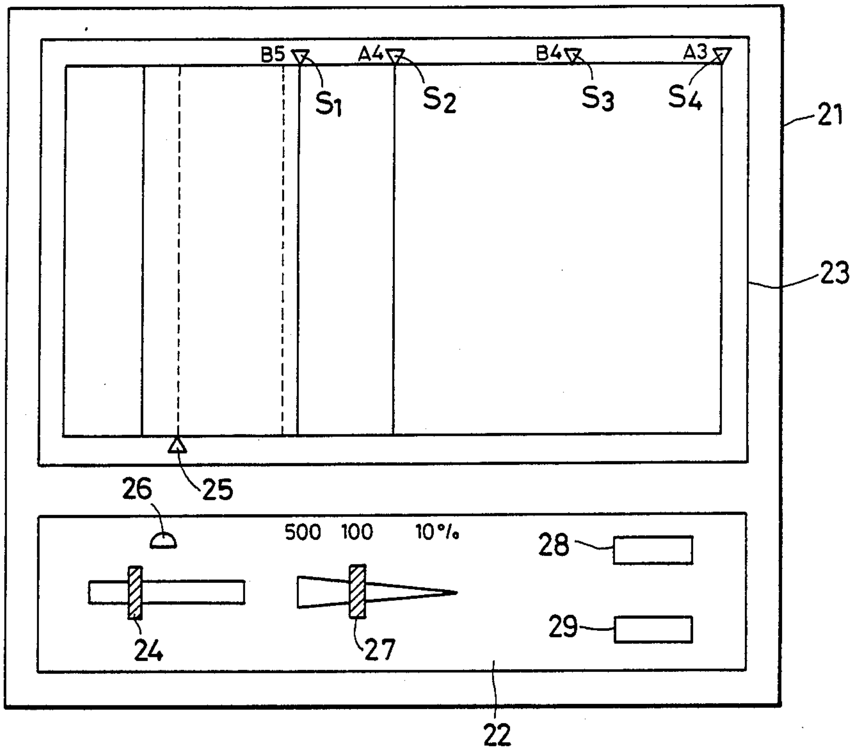
FIGS. 3, 10, 14, 17 and 24 are respectively plan views for explaining the operating panel containing therein display means and switching means as shown in FIG. 1A.

FIG. 3 is an enlarged plan view for explaining the operating section of the image reproducing apparatus including the display means 4a and switches 4c as shown in FIG. 1B, wherein the operating panel 21 is composed of an operating section 22 and a display section 23. A reference numeral 24 designates an image original size switch, by the slide-movement of which an image original size cursor 25 is moved and displayed on the display 23. A numeral 26 refers to a push-button for inputting a value of the magnification-changing ratio or a value of the magnification factor to be established by the magnificaiton-changing ratio setting switch 27 into the controller 4. Upon depression of this push-button 26, the value of the magnification-changing ratio is displayed on the display 23. A numeral 28 refers to a linear magnification-changing (or variable magnification) designation key. When this linear magnification-changing designation key 28 is depressed, and the magnification ratio setting switch 27 is moved over a certain range (e.g., in the range of from 100% to 20% of the magnification ratio), the controller 4 interprets this movement as the linear size-reduction, and accordingly controls in succession a difference in the peripheral (or circumferential) velocity between the DC scanner motor 4d and DC main motor 4e so as to form on the recording paper a linear magnification-changed image. A reference numeral 29 represents a reset key, by the depression of which the entire modes to be set are established in the life-size or unity magnification (unity magnification). Incidentally, at the time of closing the power source, a life-size mode is established. Reference letters $S_1$ to $S_4$ represent the size indexes, which correspond respectively to the original size of B5, A4, B4 and A3.

Figure 4:
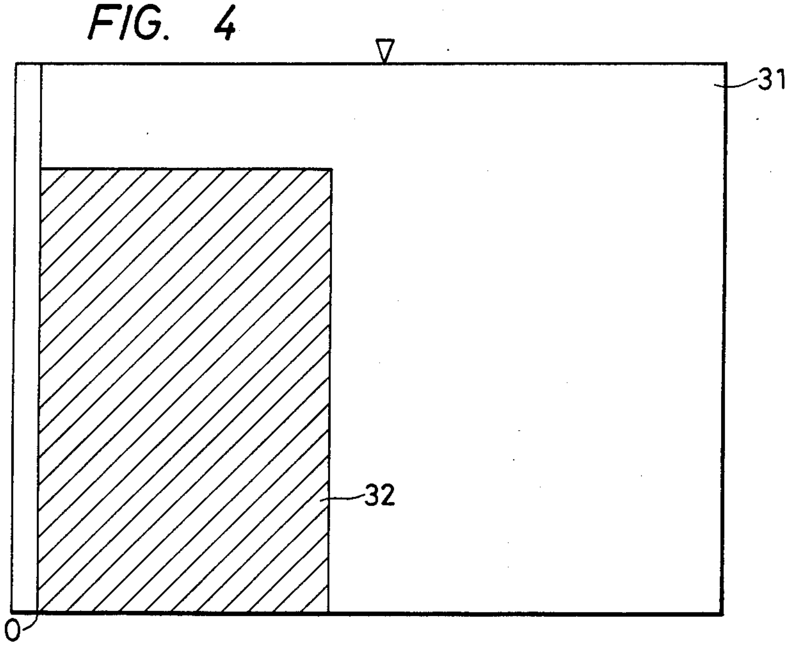
FIG. 4 is a schematic diagram for explaining the setting operation for the stepwise magnification-changing according to the present invention.

FIG. 4 is a schematic diagram for explaining the stepwise magnification-changing setting operation according to the present invention. In the drawing, a reference numeral 31 designates a glass table for placing the image original, which is shown to have an image original 32 in A4 size, for example, at its original placement reference point 0.

Figure 5A:
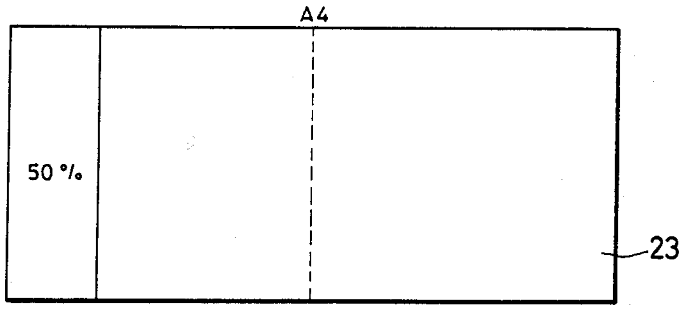
FIGS. 5A, 5B and 5C are respectively schematic diagrams for explaining the established states of the stepwise magnification-changing according to the present invention.
Figure 5B:
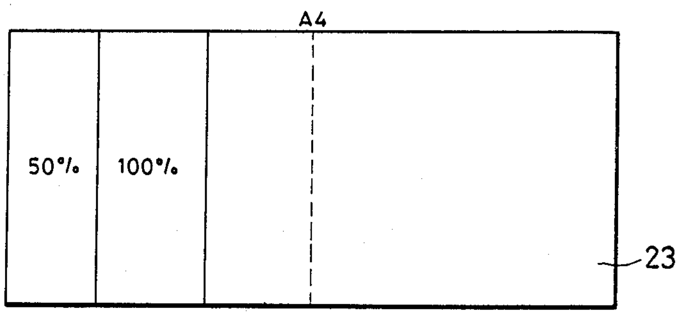
Figure 5C:
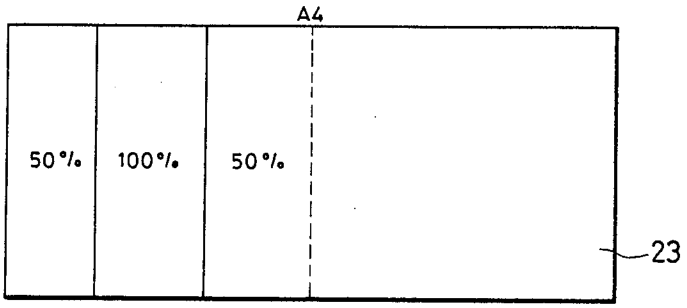

First of all, the image original 32 is placed on the original placement reference point 0 as shown in FIG. 4. Subsequently, when the original size switch 24 is moved for a setting of about ⅓ of the original size, while observing the display 23, and when the magnificaiton-changing ratio is set by the magnification ratio setting switch 27 at 50%, for example, followed by depression of the push-button 26, there will be displayed on the display 23 an area corresponding to the designated size and the value of the magnification ratio of 50%, as shown in FIG. 5A. Following this, when the original size switch 24 is moved for a setting of about ⅓ of the original size in the same manner as mentioned above, while observing the display 23, and when the magnification-changing ratio is set by the magnification ratio setting switch 27 at 100% (life-size), for example, followed by depression of the push-button 26, there will be displayed on the display 23 an area corresponding to the designated size and the value of the magnification ratio of 100%, as shown in FIG. 5B; in other words, both the area and magnificaiton ratio are stored in the memory of the controller 1. Further, when the original size switch 24 is moved for a setting of about ⅓ of the original size, while observing the display 23, and when the magnification-changing ratio is set by the magnification ratio setting switch 27 at 50%, for example, followed by depression of the push-button 26, there will be displayed on the display 23 an area corresponding to the designated size and the value of the magnification ratio of 50%, as shown in FIG. 5C. At this stage, the display 23 indicates three discrete areas having different magnification ratio as designated, and these three areas and the magnification ratios are stored in the memory of the controller 1. When a copy key (not shown in the drawing) is then depressed, the controller 4 controls the difference in the peripheral velocity between the DC scanner motor and the DC main motor at every area as displayed on the display 23, whereby there can be formed simultaneously those images, each having a different magnification-changing ratio in the course of reproducing a single image.

In the following, explanations will be given in reference to FIGS. 6A and 6B as to the linear magnification-changed image forming operations.

Figure 6A:
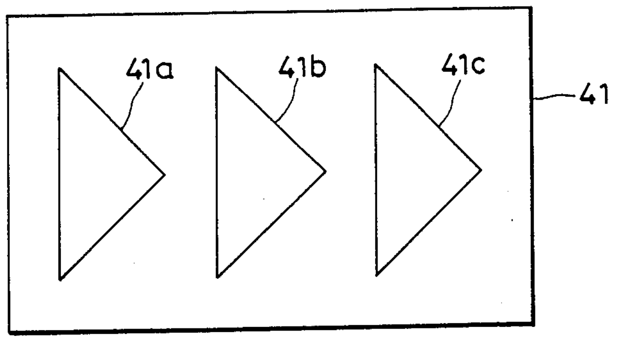
FIGS. 6A, 6B, 11A, 11B, 12A and 12B are schematic diagrams for explaining the image forming operations of the linear magnification changing according to the present invention.
Figure 6B:
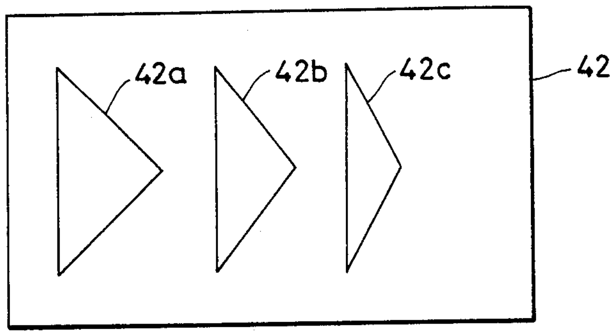
Figure 7:
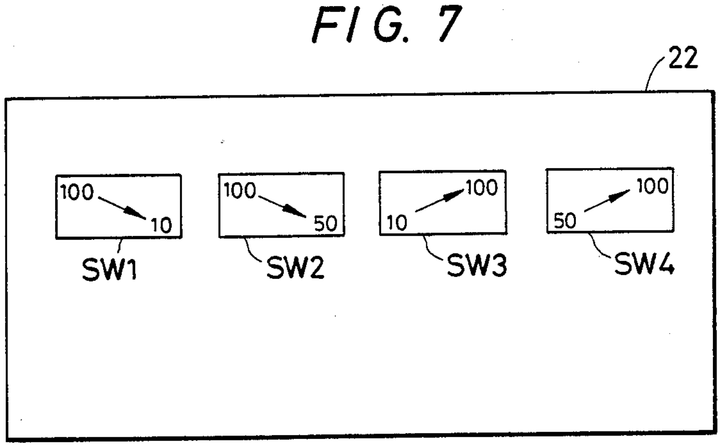
FIG. 7 is a shcematic diagram showing the disposition of the linear magnification-changing switches.

FIGS. 6A and 6B are schematic diagram for explaining the linear magnificaiton-changed image forming operations.

In FIG. 6A, a reference numeral 41 designates an image original, which is shown to contain patterns 41a to 41c of the same size and arranged at equally spaced intervals. In FIG. 6B, a numeral 42 refers to a reproduced image, in which patterns 42a to 42c with linear size-reduction ratios of from 100% to 10% are successively reproduced as output.

In more detail, such reproduced image 42 containing therein successively size-reduced patterns 42a to 42c as shown in FIG. 6B may be output in the following manner: the image original 41 in A4 size, for example, is placed on the glass table for the original at its reference point 0; in this state, the original size switch 24 is slided to the position of the size index $S_2$; at this position, the push-button 26 is depressed, followed by further depression of the linear magnification-changing key 28, and, at the same time, the magnificaiton ratio setting switch 27 is slided in a range from 100% to 10%, for example; after this, the copy key (not shown in the drawing) is depressed, whereupon the controller 4 establishes the linear size-reduction magnification-changing mode of from 100% to 10% and controls the difference in the peripheral velocity between the DC scanner motor 4d and DC main motor 4e to thereby output the image patterns 42 in the designated size, i.e., to output successively the linear size-reduced images 42a to 42c as shown in FIG. 6B. Incidentally, when linear magnification-changing setting switches SW1 to SW4 are provided in the operating section 22, the linear magnification-changing setting operation can be simplified.

Figure 8:
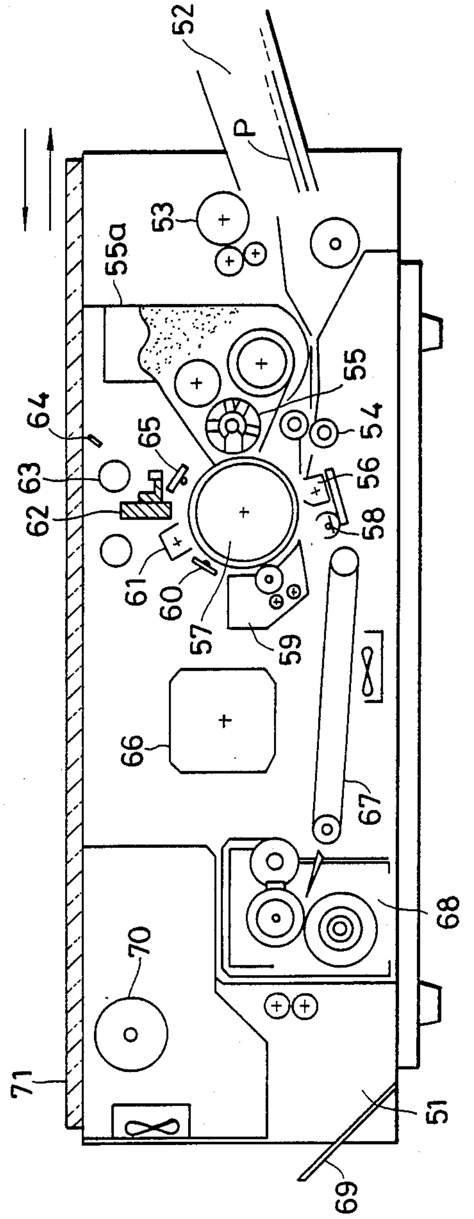
FIG. 8 is a cross-sectional view of an image forming apparatus, to which the present invention is applied.

FIG. 8 is a cross-sectional view of an image forming apparatus, to which the present invention is applied. In the drawing, a reference numeral 51 designates an apparatus main body, and a numeral 52 refers to a paper-feeding cassette, from which the recording paper is fed by a paper-feeding roller 53 to the position of a registration roller 54. Incidentally, the paper-feeding cassette 52 is provided with a protrusion to indicate a size of the recording paper to be placed therein, which functions to actuate a micro-switch provided in the apparatus main body 51, which introduces a paper size signal as an input into the controller 1 (FIG. 1A). A numeral 55 refers to a developing device equipped with a toner hopper 55a to accommodate therein toner (developing agent). A reference numeral 56 indicates an image transfer charger which functions to transfer the toner image as developed on the photosensitive drum 57 onto the recording paper. A numeral 58 refers to a charge-removing lamp which functions to remove electric charge from the recording paper and separate it from the photosensitive drum 57. A numeral 59 refers to a cleaning section where the toner remaining on the photosensitive drum is recovered. A reference numeral 60 designates a charge-removing lamp which functions to remove electric charge by irradiating the photo-sensitive drum 57. A numeral 61 refers to a precharger which functions to uniformly charge the photosensitive drum 57 so as to prepare for the latent image formation. A reference numeral 62 represents a fiber lens which functions to slit-expose the reflceted light from an exposure lamp 63. A numeral 64 refers to a blue cell such as a solar battery or the like which detects light quantity of the exposure lamp 63 to control the light output of the exposure lamp 63. A reference numeral 65 indicates an erasing lamp which irradiates the photosensitive drum 57 along its breadth to give uniform fatigue to the photosensitive drum 57. A numeral 66 refers to a main motor for rotation of various elements of the reproduction apparatus. A numeral 67 designates a conveyor belt for conveying the recording paper to the position of the image fixing device 68. A reference numeral 69 denotes a paper discharging tray, on which the recording paper with an image having been formed thereon is placed. A numeral 70 refers to a scanner motor for driving the optical scanning system. A reference numeral 71 denotes a glass table for placing the image original. By the way, the image forming operations follows the known method of electrophotography, hence its detailed explanations will be dispensed with.

It should be noted that the through-put of the image formation can be controlled with such construction wherein the controller 4 renders the speed of the DC scanner motor **4*d* constant, and the rotational speed of the DC main motor 4*e* to be input from the operating section 22 in a manner to be made variable. At that time, the control is done in such a way that, if the rotational speed of the photosensitive drum is increased, the light output of the exposure lamp is also increased, and, if its rotational speed is decreased, the light output of the exposure lamp is decreased. The erasing lamp 65 has as its function the providing of uniform fatigue to the photosensitive drum 57, and of preventing a latent image from forming by irradiation of those areas other than the clipping image and cutting image areas. This function can be established by an area erasure designating switch (not shown in the drawing). It is also possible that, when a zoom lens is used for the optical system in FIG. 8** to effect the magnification-changing mode by varying the zooming ratio of the lens during the reproduction operations, the magnification-changing in the auxiliary scanning direction is effected, whereby designing of the patterns by use of the copying facility becomes versatile.

In the following, explanations will be given in reference to FIGS. 9A to 9D as to the general flow in the sequential operations for the magnification-changing mode according to the present invention, as programmed in the memory of the controller 1. It should be noted that this particular embodiment designates an area, in which a fixed magnification-changing and the linear magnification-changing are to be effected. It is however feasible the fixed magnification-changing mode and the linear magnification-changing mode may be used in combination for each area using a part of a single original image.

Step-201: an operator effects setting of the magnification-changing mode; in particular this embodiment relates to the operating modes for the partial magnification-changing and the area designating magnification-changing.

Step-202: the area for the magnification-changing is designated by the switches 24, 27 and the push-button 26 in FIG. 3; at the same time, the erasing switch (not shown) is provided in the operating section in FIG. 3 to effect erasure of the area, which may be done by erasing the designated area by use of the erasing lamp 65 in FIG. 8.

A judgement is made as to whether the size of the original image and that of the recording paper conform to each other, or not; in other words, a judgement is made as to whether the image transfer onto the recording paper is possible with the established magnification-changing ratio, or not; if the image to be reproduced would possibly spread beyond the recording paper, a warning signal is emitted.

The number of copies is set.

A judgement is made as to whether the magnificaiton-changing mode is the linear magnificaiton-changing mode where an area is designated, or not.

A determination is made of the magnification-changing ratio in case the area is designated.

Steps 207 and 208: the arithmetic operation is done to find the ratio of the peripheral velocity of the optical system and the drum driving motor at that time; a speed ratio is computed and stored in the registeres L, M and N of the controller 1; for example, when a designated area having a width of 10 cm in the original image is to be continuous by changed its magnification from 100% to 50%, a speed data corresponding to 100% is stored in the register L, a speed data corresponding to 50% is stored in the register M, and a data corresponding to an increased speed is stored in the register N so that the speed increase may be attained at a rate of 5% per 1 cm; the same operations are effected for other areas, and the data are stored in other registers.

A judgement is made as to whether the operator has depressed the copy start key, or not.

Step-210: the reproduction process is executed.

Step-211: based on the data in the registers L, M and N, the speed of the scanning motor is sequentially varied at every 5% of the magnification-changing ratio from 100% to 50% in the designated area, thereby effecting the linear magnification-changing for each partial area; in the same manner, the linear magnification-changing is effected on other areas; also, when there is an area to be erased, erasure of the area is effected by illuminating the lamp as soon as it arrives at a position on the photosensitive drum surface corresponding to the area to be erased; the data for erasure of the area is also stored in the memory beforehand so that the erasure may be done in that area.

A judgement is made as to whether the set number of recording sheets have been copied, or not.

Step-213: after completion of the copying process, cleaning of the drum, mechanical initialization and positioning are effected in preparation for the subsequent copying process.

Step-214: the passage of time until the copy start key is depressed again is calculated; when it is not depressed, the operational sequence proceeds to the subsequent Step-215.

Step-215: each mode which is currently established is reset so that the initial mode may be set.

Step-216: the setting and display are effected for the initial mode, life-size reproduction, single copying, and A4 size (or first) paper cassette.

Step-217: a stand-by routine until the copy start key is depressed again, or a new mode is established.

Step-218: a judgement is made as to whether the magnification-changing mode is fixed, or not.

Step-219: a judgement is made as to the area for the fixed magnification-changing ratio (if there is an area to be erased, a judgement is also made on it).

Step-220: the peripheral speed ratio for the fixed magnification-changing is computed, and the results of the arithmetic operations are stored in the registers O, P and Q for each area.

Step-221: a judgement is made as to whether the copy start key is depressed, or not.

Step-222: the reproduction process is executed.

Step-223: based on the data stored in each of the registers at Step-220, the fixed magnification-changing and the erasure of the designated area are effected for each area.

Step-224: a judgement is made as to whether the set number of sheets have been copied, or not.

Figure 10:
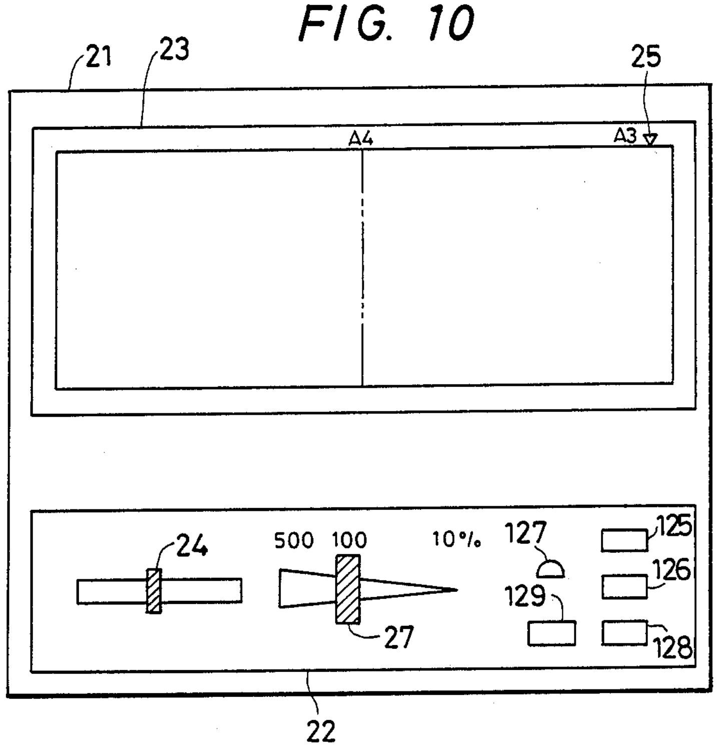

Referring now to FIG. 10 showing an enlarged plan view for the explanation of the operation section including the display means 4*a* and the switches 4*c* as shown in FIG. 1B, a reference numeral 21 designates an operating board which is constructed with an operating section 22 and a display section 23. A numeral 24 refers to an image original size switch, by slide-movement of which an image original size cursor 25 moves on the display 23 to indicate its position. A reference numeral 125 designates a fixed magnification-changing key, by depression of which the fixed magnification-changing mode is set. A numeral 126 refers to a linear magnification-changing key, by depression of which a linear magnification-changing indicator 127 is lighted, and the linear magnificaiton-changing mode is established. A reference numeral 128 denotes a random copy key, by depression of which the controller 4 automatically establishes the linear magnification-changing ratio in accordance with the input signals for the image original size and the recording paper size. A numeral 129 refers to a reset key for releasing each mode as established. A numeral 27 indicates a magnification ratio setting switch which is capable of setting the image magnification ratio of from 500% to 10% in succession, for example.

Incidentally, in the above-described embodiment of the present invention, explanations have been made as to a case wherein the image original size is established by the image original size switch 24. It is, however, possible to construct the apparatus in such a manner that a photo-sensor or an image-sensor for detecting the image original size is disposed at a predetermined location on the image original placement table so as to recognize the original size.

Figure 11A:
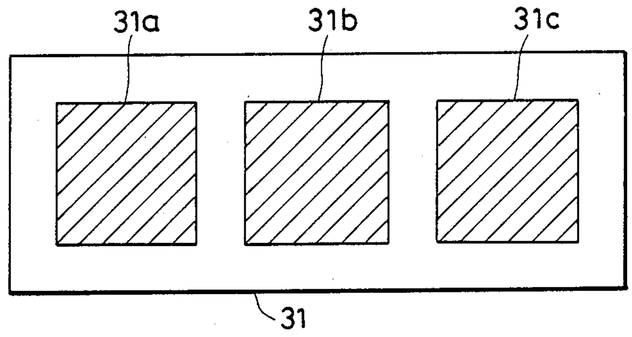
Figure 11B:
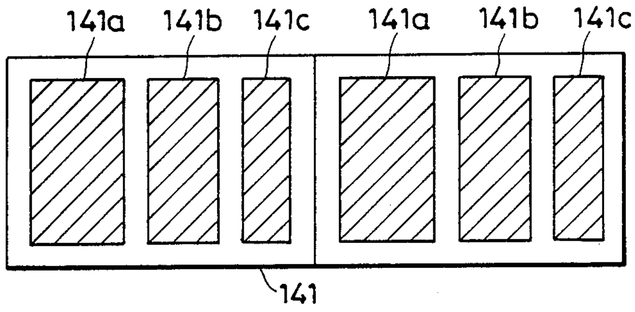

FIGS. 11A and 11B are respectively schematic diagrams for explaining the linear magnification-changing image formation. In FIG. 11A, a reference numeral 31 designates an original image which is slightly larger than A3 size paper, for example, in which original image patterns 31*a* to 31*c* of the same size are drawn. In FIG. 11B, a reference numeral 141 designates a reproduced image, in which linear reproduced image patterns 141*a* to 141*c* are outputted in two divided portions in the A4 size paper.

First of all, in the state of the image original 31 shown in FIG. 11A being placed on the glass table 12, the original size switch 24 is slided, while observing the original size cursor 25 displayed on the display 23, and the original size of "A3" is established as shown in FIG. 10. Subsequently, the linear magnification-changing key 126 is depressed to establish the linear magnification-changing mode, and at the same time, the magnificaiton ratio setting switch 27 is moved to establish the linear magnification-changing ratio, for example, of from 100% to 10%. Incidentally, when the linear magnification-changing key 126 is depressed, the linear magnificaiton-changing indicator 127 is lighted to notify the operator to that effect.

At this instant, when the selected recording paper is in A4 size, for example, and the copy key is depressed, the controller 4 linearly controls the speed ratio (a difference in the peripheral speed) between the DC scanner motor 4*d* and the DC main motor 4*e* so as to halve the recording paper (see FIG. 11B) for output of the linear magnification-changed images 41*a* to 41*c* so that the linear magnification-changed images of from 100% to 10% may be formed on each portion of the recording paper in A3 size.

At this instant, the recording paper is once separated from the photosensitive drum 16 at this divided area, and then the stand-by routine is effected until the image original scanning section 13 returns to its home position, after which the latent image formation is executed again in the same manner as described above and then the image on the drum is registered with the recording paper, after which the toner image is transferred onto the recording paper. Also, at the time of the fixed magnification-changing mode, there can be formed such fixed magnification-changed images by dividing the recording paper in the same manner as mentioned above. Further, from the information on the sizes of the recording paper and the original image, the controller 4 automatically changes the linear magnification-changing ratio as established at the time of the linear magnification-changing mode so that it conforms with the size of the recording paper, and linearly controls the speed ratio (peripheral speed difference) between the DC scanner motor 4*d* and the DC main motor 4*e* so that the reproduced image may be properly positioned on the recording paper.

In the following, explanations will be given in reference to FIGS. 12A and 12B as to the automatic magnification-changing ratio setting operations.

Figure 12A:
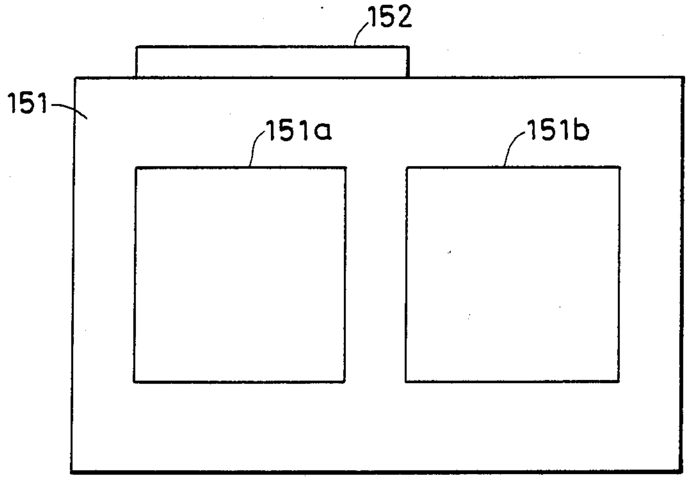
Figure 12B:
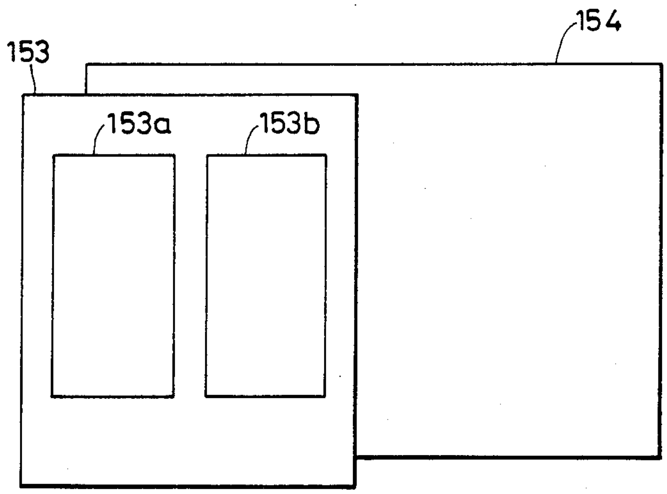
Figure 13A:
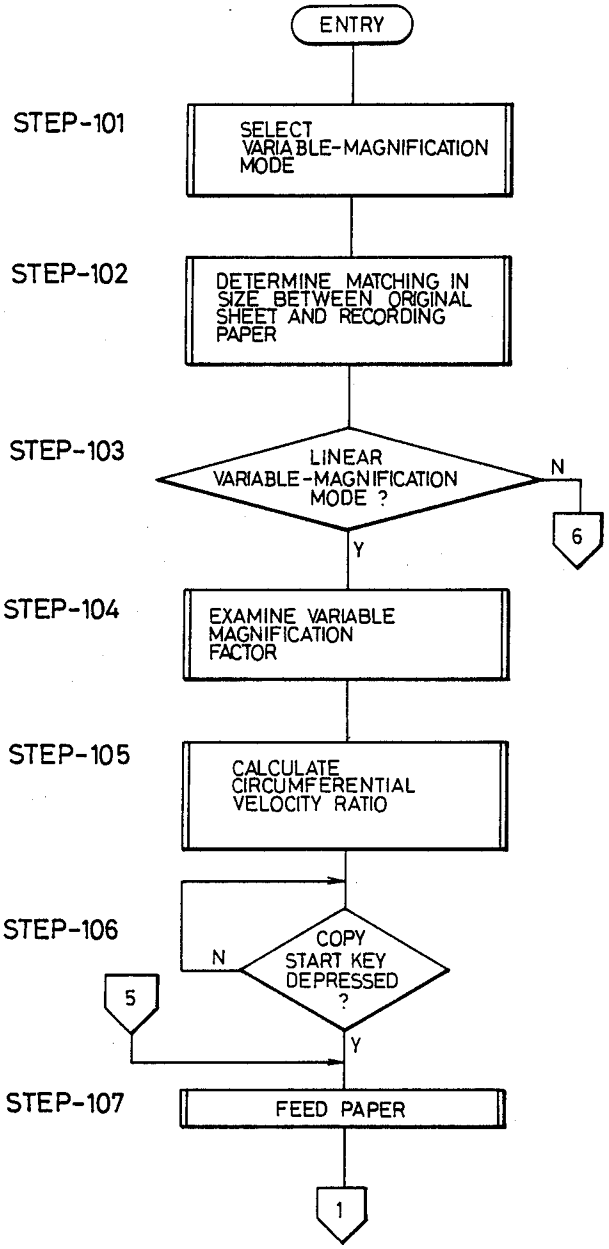
Figure 13B:
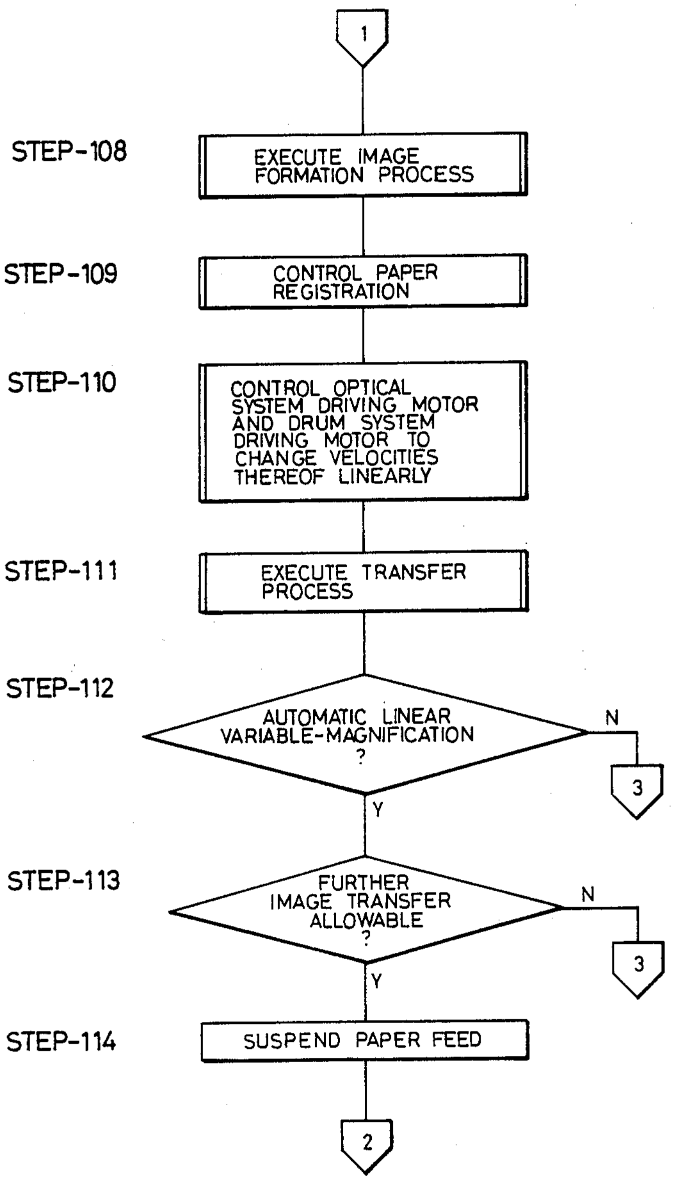
Figure 13C:
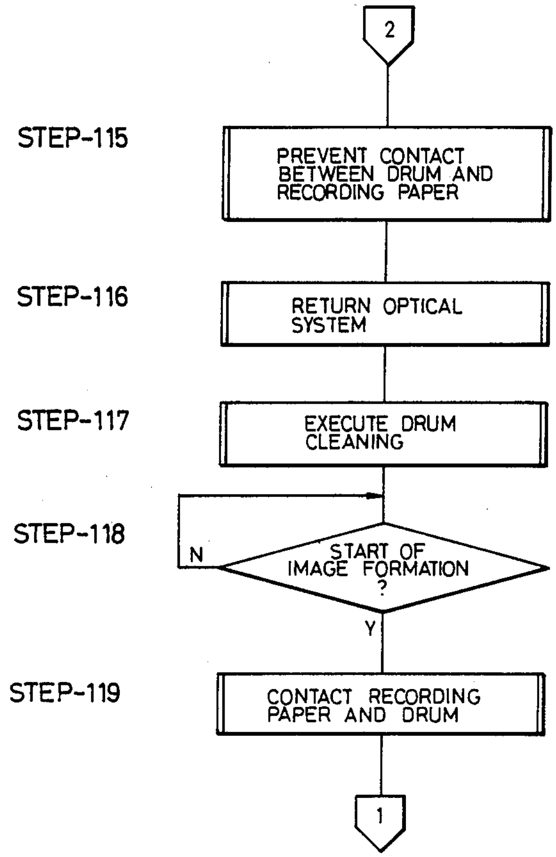
Figure 13D:
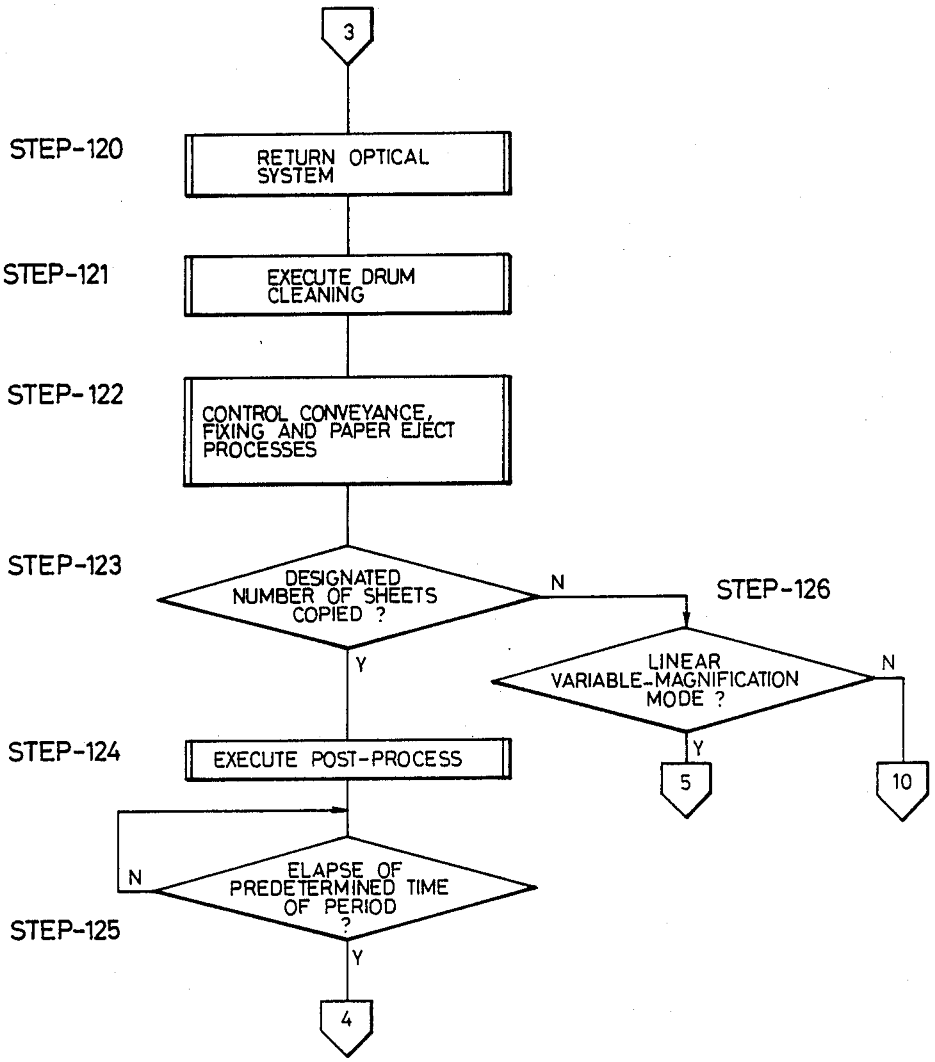
Figure 13E:
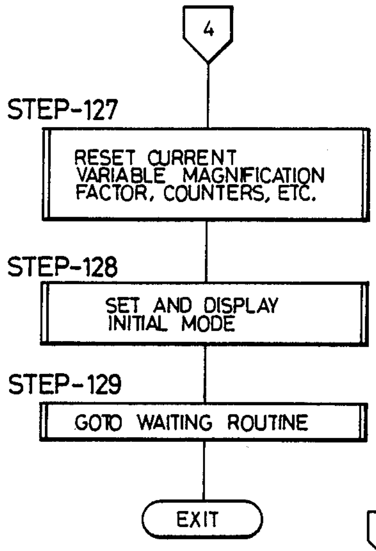
Figure 13F:
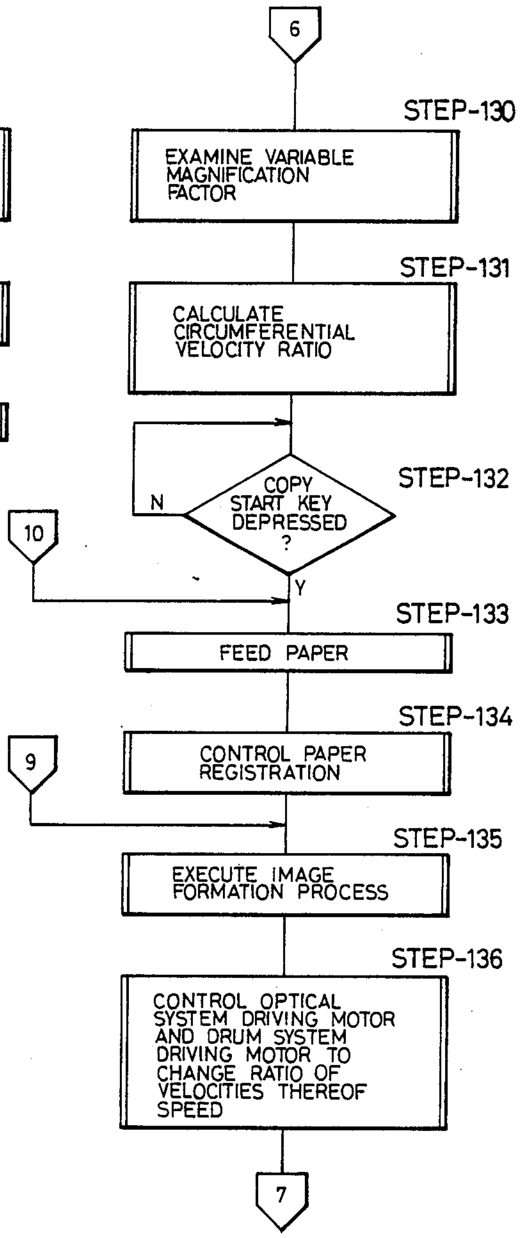
Figure 13G:
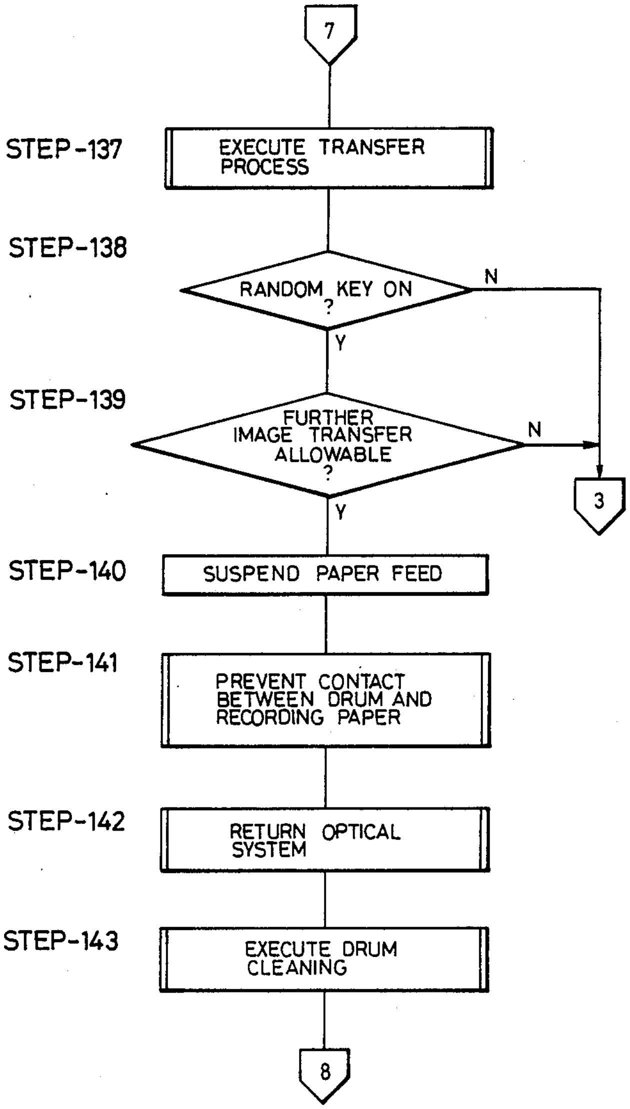
Figure 13H:
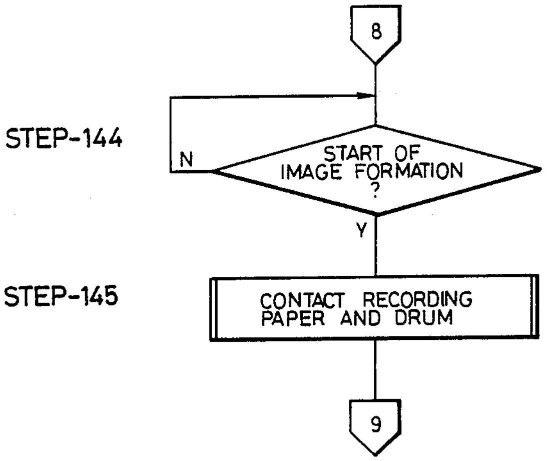

FIGS. 12A and 12B are respectively schematic diagrams for explaining the automatic magnification-changing ratio setting operations according to the present invention. In FIG. 12A, a reference numeral 151 designates an original image of A3 size, for example, in which image patterns 151*a* and 151*b* are drawn. On the other hand, a reference numeral 152 indicates a recording paper of A4 size, for example, in which case the size of the recording paper is smaller than that of the original image.

In FIG. 12B, a numeral 153 refers to an original image in A4 size, for example, in which image patterns 153*a* and 153*b* are drawn. On the other hand, a reference numeral 154 denotes a recording paper of A3 size, in which case the recording paper has a size larger than that of the original image.

First of all, the original image size switch 24 is moved to set the image original size at A3, after which the linear magnificaiton-changing key 126 is depressed and further the random key 128 is depressed, whereupon the automatic linear magnification-changing mode is established in the controller 4, i.e., the size of the recording paper to be input by the micro-switch, for example, is detected to thereby set the automatic linear magnification-changing mode. At this instant, relationship between the original image size and the recording paper size is as shown in FIG. 12A, hence the controller 4 automatically establishes the linear magnification-changing for the size-reduction. When a copy key (not shown in the drawing) is depressed, the controller 4 linearly controls the speed ratio (peripheral speed difference) between the DC scanner motor 4d and the DC main motor 4e to thereby control the driving of the image original scanning section 13 and the photosensitive drum 16 so as to output the linear size-reduced images in conformity with the size of the recording paper. Also, in the case of the recording by thermal transfer, the magnification-changing can be done by varying the paper feeding speed, while the magnification-changing in the main scanning direction can be effected by varying the number of the reading image data.

When the relationship between the original image size and the recording paper size is such that, as shown in FIG. 12B, the recording paper size is larger than the original image size, the controller 4 automatically establishes the linear magnificaiton-changing for size-enlargement. In this case, the controller 4 controls the driving of the original image scanning section 13 and the photosensitive drum 16 in such a manner that it linearly controls the speed ratio (peripheral speed difference) between the DC scanner motor 4d and the DC main motor 4e to output the linear enlarged image in conformity with the recording paper size. By the way, when the fixed magnification-changing key 126 is depressed, followed by further depression of the random key 128, the controller 4 automatically establishes the fixed magnification-changing ratio in conformity with the sizes of the recording paper and the original image, and then controls the speed ratio (peripheral speed difference) between the DC scanner motor 4d and the DC main motor 4e so that the image may be placed on the appropriate size of the recording paper, thereby outputting the fixed magnification-changed image on the recording paper without an excess or shortage of space on the recording paper.

FIGS. 13A through 13H are flow charts for the fixed magnification-changing, the fixed random copy magnification-changing, the linear magnification-changing, and the linear random copy magnificaiton-changing (in the flow charts, this is denoted by "automatic"), respectively.

The term "fixed magnification-changing" as used in the present invention means that a change in the magnification of an image can be done at a certain definite ratio by varying the driving speed ratio between the optical system and the drum system, which can be attained by depressing the fixed magnification-changing key 125 in FIG. 10.

The "fixed random copy magnification-changing" operation is effected by depressing the keys 125 and 128 shown in FIG. 10. In this case, by establishment of a ratio between the original image size and the recording paper size and a magnification-changing ratio, the image of the original is automatically reproduced within the size of the recording paper for any number of sheets as desired.

The "linear magnification-changing" operation is determined by depression of the keys 126 and 128 and the magnification ratio setting switch 27 in FIG. 10. The switch 27 determines, in the case of the fixed magnification-changing, the magnification-changing raio by the position where it is stopped, and, in the case of the linear magnification-changing, by the amount of its sliding, when the knob of the switch is slided, while it is being pressed down.

Figure 14:
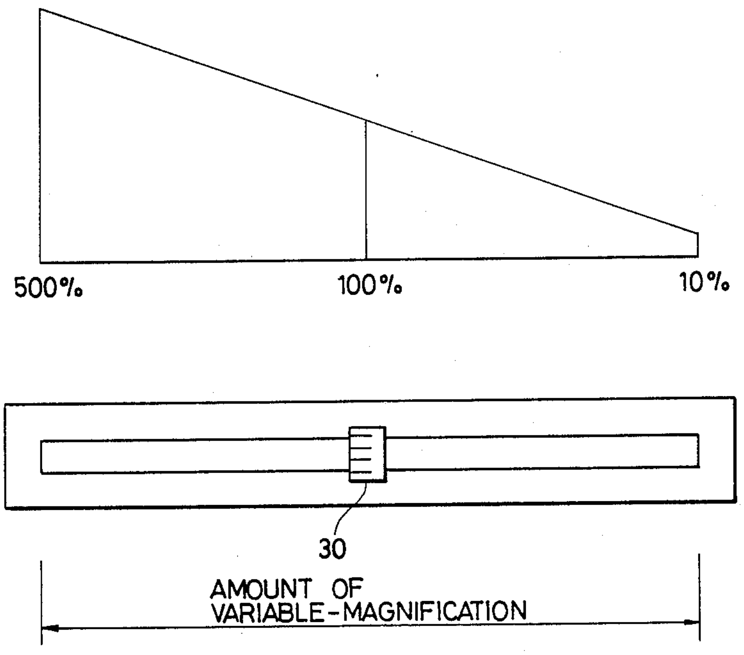

FIG. 14 indicates the relationship between the position of the switch and the magnification-changing quantity. The knob 30 of the switch is usually set apart from the contact point, which comes into contact with the electrically conductive part when it is pushed down. In the linear magnification-changing mode, the knob is slided in the state of its being pushed down, and the amount of its sliding denotes the range of the magnification-changing. For instance, when the knob is first shifted by sliding to the position of "200%", and then it is further slided from "200%" to "50%" by being pushed down, its moving quantity of "200% to 50%" stands for the linear magnification-changing value. Also, when the knob 30 is moved to a position of "50%", and is then further moved from "50%" to "200%" by being pushed down, its moving quantity of "50% to 200%" becomes the linear magnificaiton-changing value. By the former shifting of the knob 30, the scale of the image successively changes from an "enlarged scale" to a "reduced scale", while, by the latter shifting of the knob, the scale of the image successively changes from a "reduced scale" to an "enlarged scale".

By the "linear random copy magnification-changing" mode, reproduced images can be automatically formed in succession on one and the same recording paper to the maximum possible extent on the basis of a ratio between the size of the original image and the size of the recording paper as well as the magnification-changing ratio as determined. Accordingly, a plurality of images in varying scales are reproduced on one and the same recording paper.

In the following, the above-described magnification-changing operations will be explained in reference to the flow charts.

Step-101: the magnification-changing mode is established; in the case of the fixed magnification-changing mode, the key 125 in the display and operating section shown in FIG. 10 is depressed; in the case of the linear magnification-changing mode, the key 126 is depressed; in the case of the random copying, the key 128 is depressed; the magnification ratio is set by the switch 27, and the original image size is set by the switch 24.

Step-102: the controller determines a ratio between the original image size and the recording paper size, for which the switch 24 sets the original image size, and the recording paper stored in the paper cassette is determined by the detection switch.

Step-103: a judgement is made as to whether the magnification-changing mode is linear, or not.

Step-104: when it is in the linear magnification-changing mode, the controller calls out the set value which has been input into the memory by the switch 27, and the magnification-changing ratio is determined.

Figure 9A:
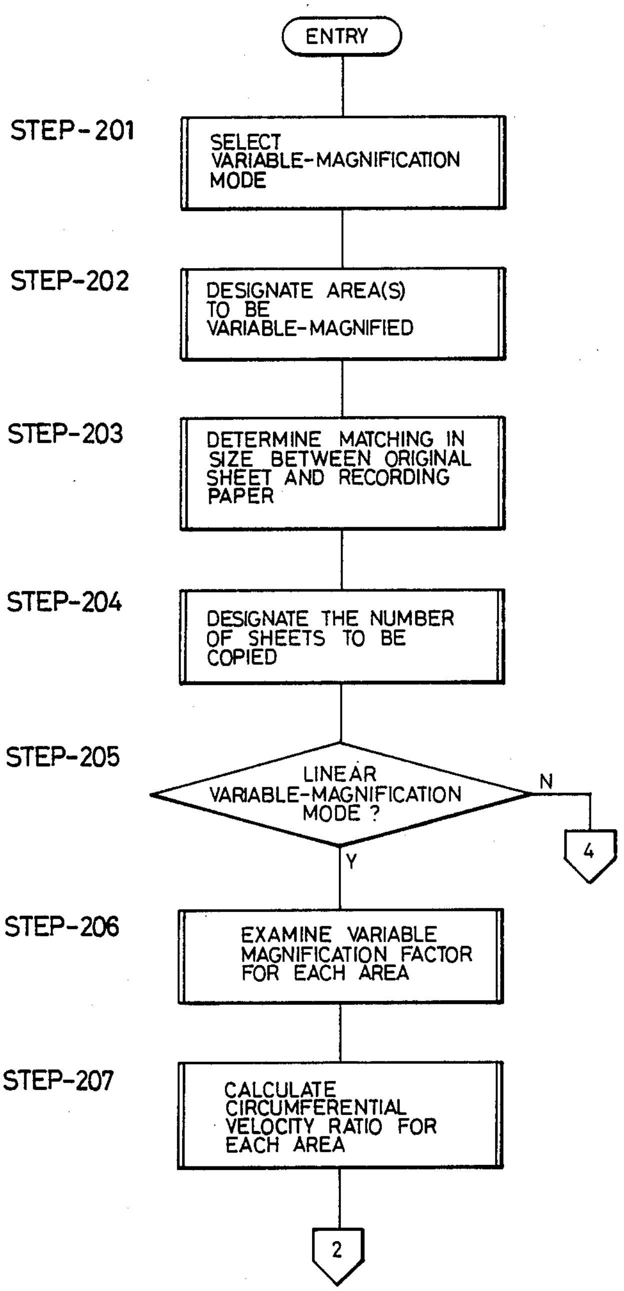
FIGS. 9A to 9D and 13A to 13H are respectively flow charts for the linear magnification-changing.
Figure 9B:
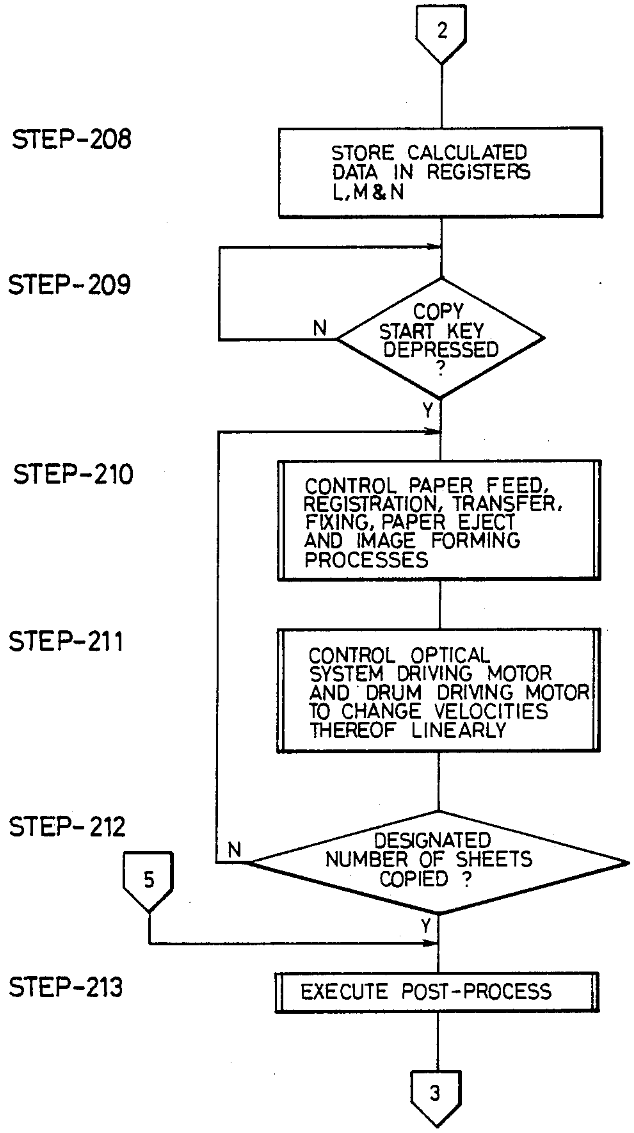
Figure 9C:
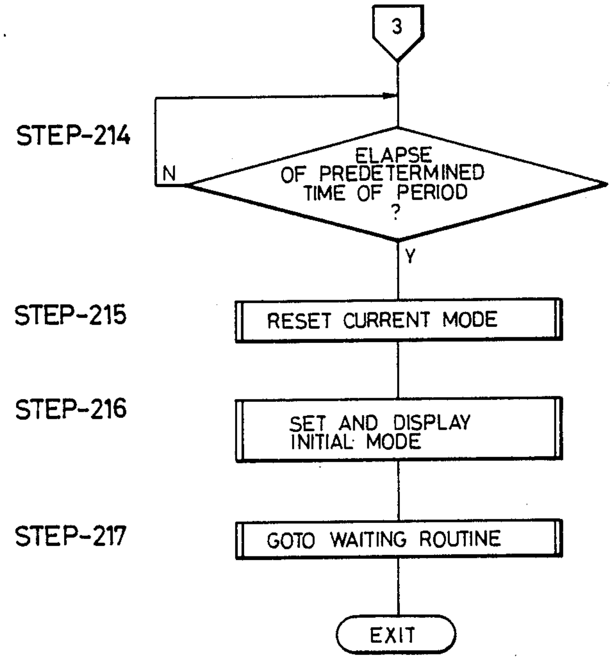
Figure 9D:
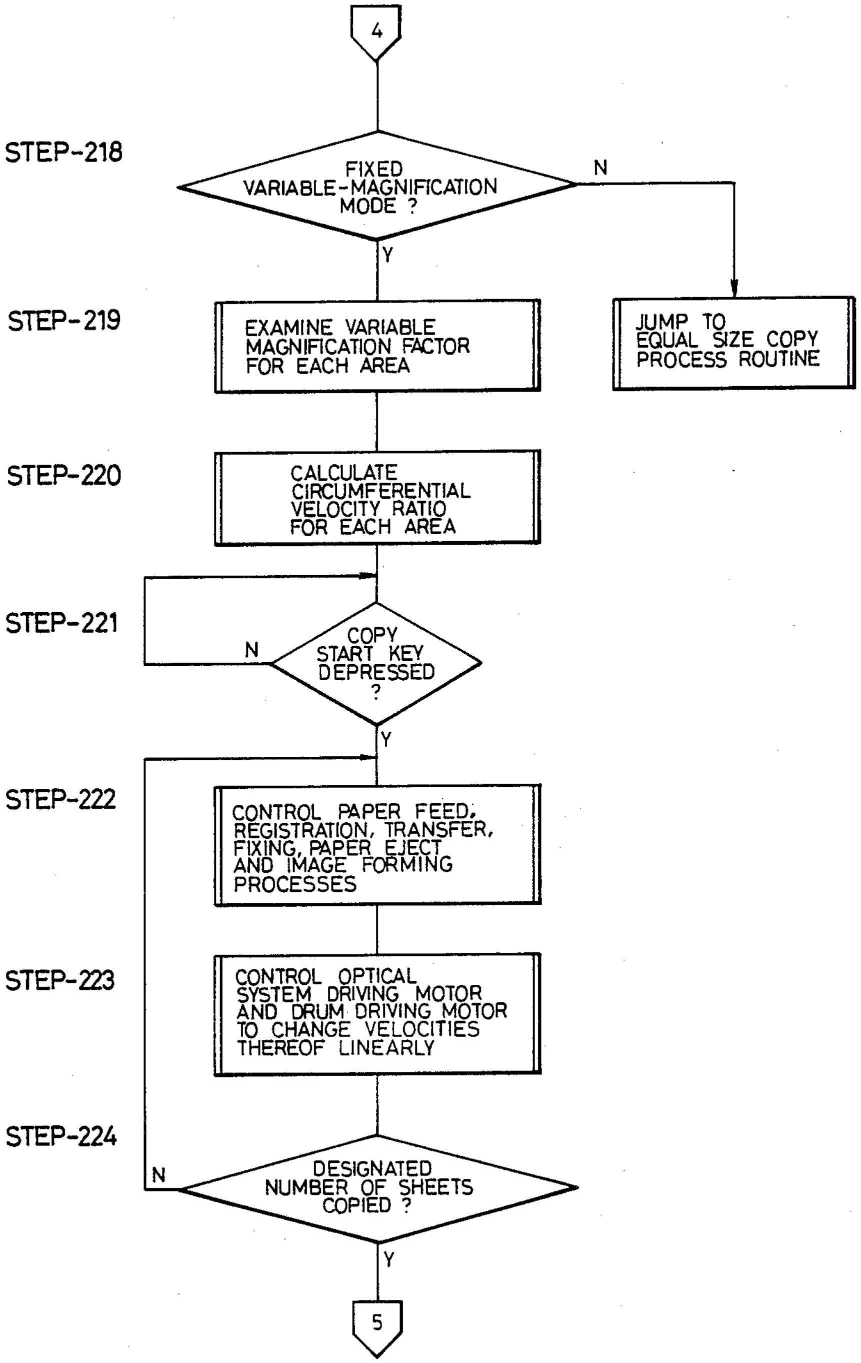

Step-105: from the magnification-changing ratio as determined at Step-104, the peripheral speed ratio (i.e., a speed ratio between the driving system and the optical system driving system) is calculated in advance; since this is the linear magnification-changing mode, it is necessary that the speed ratio between the optical system and the drum system be made continuously variable along with the amount by which the optical system moves; when a pulse motor is used for driving the optical system and the drum system, the varying quantity of the pulse train per unit time is calculated; when a servomotor is used, a varying quantity for continuous variation of the reference clock pulse is calculated, the result of which is stored in the control register (this is the same as Steps-207 and 208 in FIGS. 9A and 9B).

Step-106: a judgement is made by the operator as to whether the copy start key has been depressed, or not.

Step-107: paper-feeding is effected from the paper cassette; this paper feeding is done on the basis of a predetermined timing.

Step-108: the image forming system starts its operations; generation of the charging corona, irradiation of the exposure lamp, driving of the optical system, and the developing system start their operations to form a latent image on the photosensitive drum, which is than developed by the developer.

Step-109: registration between the forward end of the paper as fed and the distal end of the image is effected.

Step-110: drive control of the motor for the optical system and the drum drive system is effected on the basis of the values as calculated at Step-105; since this is the linear magnification-changing mode, a continuous varying quantity is given as the speed ratio of the motor on the basis of the set values (this is the same step as Step-210 in FIG. 9B).

Step-111: the image formed on the photosensitive drum is transferred; the image transfer corona is energized.

Step-112: the linear magnification-changing random copying is effected upon depression of the random key 128 in FIG. 10.

Step-113: since this is the random copying mode, it is possible to form the reproduced image on a plurality of sheets of the recording paper; depending on the magnification-changing ratio, if the size-reduction ratio is high, it is possible to reproduce a plurality of images on one sheet of recording paper by scale-reduction of a large number of original images; at this step, further a judgement is made as to whether the image as formed can be placed on the recording paper, or not, which judgement can be accomplished by the arithmetic operations of the controller based on the size of the original image, the size of the recording paper, and the magnification-changing ratio.

Step-114: after transfer of a plurality of reproduced images on one sheet of the recording paper, the operation is once stopped.

Step-115: cleaning of the photosensitive drum; for the preparation of the subsequent image forming operations, the recording paper, in the state of its being stopped and not fed is slightly lowered by a mechanical means to avoid contact with the drum, thereby forming a space between the paper and the drum.

Step-116: in preparation for the subsequent image forming operations, the scanner of the optical system is returned to its home position.

Step-117: the drum is cleaned for the subsequent image forming operations.

Step-118: upon completion of the entire preparatory work, the image is formed on the photosensitive drum.

Step-119: machine operation is stopped; the recording paper beneath the drum is brought into contact with the drum at a predetermined timing to effect registration for the random copying; since, in the initial registration, the paper as fed is registered for meeting with the distal end of the image on the drum, the paper is once stopped at the registration roller and then this registration roller rotates at a predetermined timing to effect registration of the distal end of the image; however, at the time of the registration for the random copying, the paper stopped beneath the drum is brought into contact with the drum.

Step-120: during the registration, the scanning optical system returns to its home position so as to prepare for restarting.

Step-121: the photosensitive drum is cleaned so as to prepare for the subsequent image forming operations on the drum.

Step-122: the recording paper, on which the reproduced image has been transferred is processed for the image-fixing by means of a heater-roller or under pressure, after which it is discharged.

Step-123: a judgement is made as to whether the total number of sheets of the recording paper as input by the operator have been copied, or not.

Step-124: since the set number of sheets have all been copied, and the copying operations completed, the cleaning operation is effected in preparation for the subsequent copying operations; at this post-treatment step, sufficient cleaning is done so as not to cause any trouble and inconvenience in the subsequent copying, even when the photosensitive drum is left unused over a long period of time.

Step-125: a judgement is made as to whether the copy start key is not depressed after passage of a predetermined time (e.g., two to three minutes), or not; the passage of time is determined.

Step-126: since the copying operations for the set number of sheets have not been completed, the operations continue; in the case of the linear magnification-changing, the operational sequence skips back to the Step-107 to repeat the operations; in the case of the fixed magnification-changing, the sequence jumps over to Step-132 to repeat the operations.

Step-127: since the copy start key is not depressed even after passage of the predetermined time, those previously established data for the magnification-changing mode, the magnification-changing ratio, the set number of recording sheet, etc. are reset; further, in the image-fixing by use of a heater, the stand-by mode is established (for example, when the heater of 1 kw capacity is used, the minimum capacity that is capable of maintaining the intensity at a certain definite level is secured, in which case electric power of about 150 watts is supplied so as to save energy).

Step-128: the initial values, the counter "1", the life-size mode, A4-cassette mode, etc. are displayed.

Step-129: the stand-by mode is established.

Henceforward, the fixed magnification-changing mode is executed at Step-130 et. seq., However, since this is the stepwise magnification-changing over a wide range, any detailed explanations will be dispensed with.

Figure 15:
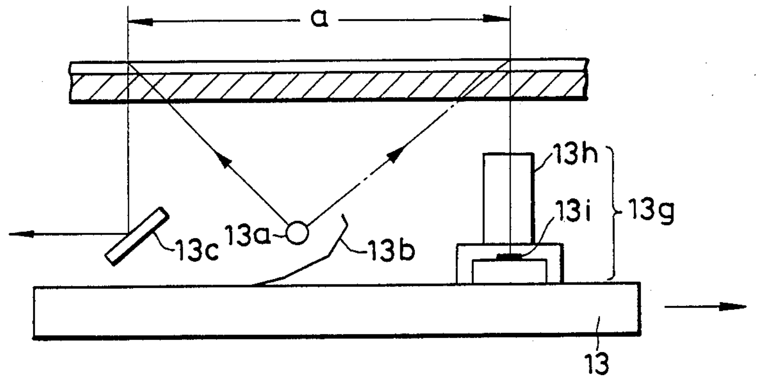
FIG. 15 is an enlarged diagram for explaining the structure of the image scanning section as shown in FIG. 2.

FIG. 15 is an enlarged schematic diagram for explaining the construction of the original image scanning section 13 shown in FIG. 2, wherein a reference letter a indicates a distance between the scanning mirror 13*c* and the image positioin detection section 13*g*.

Figure 16:
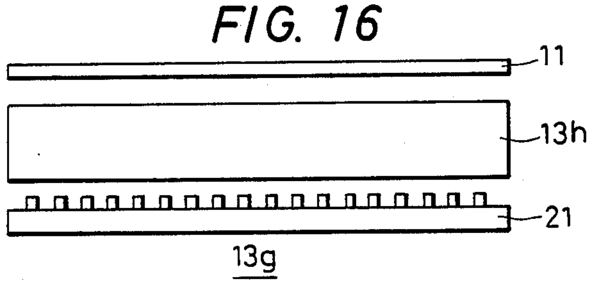
FIG. 16 is a cross-sectional view of the image original position detection means shown in FIG. 15, when it is viewed from the main scanning direction.

FIG. 16 is a cross-sectional view of the image position detection section 13g shown in FIG. 15 as viewed from the principal scanning direction, wherein a reference numeral 21 designates a photo-diode array corresponding to the image position detection section (for example, 64 photo-diodes are arranged for every pitch of 4.6 mm so as to make it possible to detect the presence or absence of the image in the longitudinal direction of the original in A4-size (296 mm long).

Figure 17:
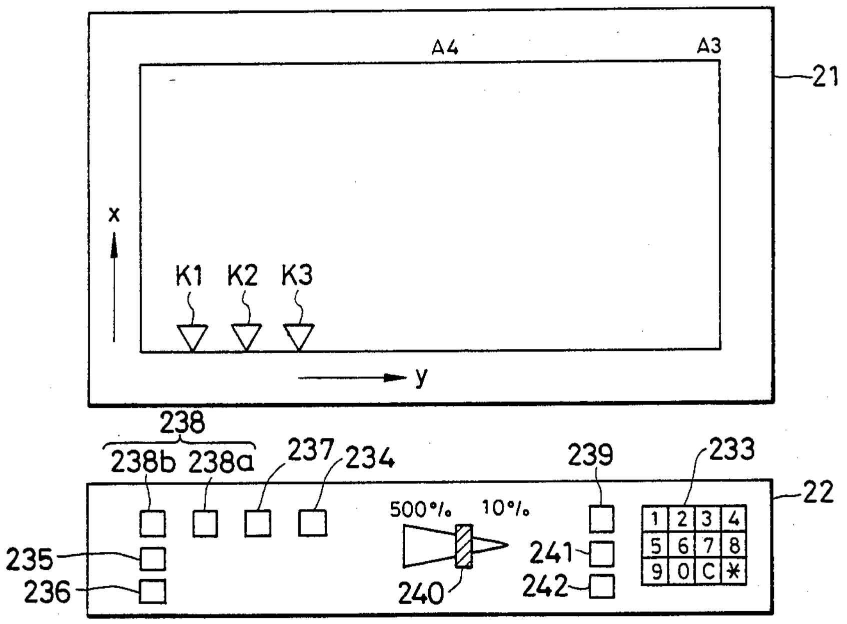

FIG. 17 is a plan view for explaining the operating section including the display means 4a and the switching means 4c as shown in FIG. 1B, wherein a reference numeral 21 designates a display panel corresponding to the display means 4a, wherein cursors K1, K2, and K3 are on display. A numeral 22 refers to the operating board having the switching means 4c. A reference numeral 233 indicates a ten-key keyboard which serves for inputting the image shifting quantity, the number of sheet for image reproduction, etc. A reference 234 denotes the magnification-changing designation key, by the depression of which the magnification-changing mode is displayed on the display 21, and, moreover, at every depression of this magnification-changing key 234, the cursor K1 shifts in the y-direction. As soon as the cursor K1 reaches an area where the magnification-changing is to be effected, the set key 235 is depressed, whereupon the position for the magnification-changing is determined. Also, upon depression of the reset key 236; the cursor K1 which has moved returns to its predetermined position. A reference numeral 237 designates an image shifting key, by the depression of which the shift mode is displayed on the display 21. Further, at every time this image shifting key 237 is depressed, the cursor K2 moves in the y-direction. As soon as the cursor K2 reaches the shifted area, the set key 235 is depressed, whereupon the shifting position is determined. Also, when the reset key 236 is depressed, the cursor K2 which has moved returns to its predetermined position. A numeral 238 refers to a deletion area setting key which is constructed with an x-direction designation key 238a and a y-direction designation key 238b, and so forth. By depression of the x-direction designation key 238a, the deletion mode is displayed on the display 21. At every time this x-direction designation key 238a, is depressed, the cursor K3 moves in the x-direction. At both the starting point and the ending point in the range of deletion, when the range designation in the x-direction is completed by depression of the set key 235, there follows depression of the y-direction designation key 238b. At both the starting point and the ending point in the range of deletion, the set key 235 is depressed, upon which the deletion area designation is completed. A reference numeral 239 represents the fixed magnificaiton-changing key, with which change in the magnification ratio which has previously been established, e.g., a size-reduction from A4-size to B5-size, is set. A reference numeral 240 designates a linear magnification-changing setting key, by the slide-movement of which the linear magnification-changing in a range of from 500% to 10% can be established. A numeral 241 refers to a linear magnification-changing designation key and a numeral 242 refers to a magnification-changing reset key which functions to release both fixed magnification-changing and linear magnification-changing.

In the following, explanations will be given in reference to FIGS. 18A nad 18B as to the image shifting operation according to the present invention.

Figure 18A:
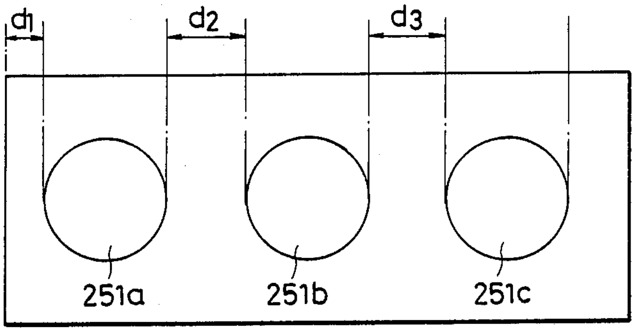
FIGS. 18A and 18B are schematic diagrams for explaining the image shifting operations according to the present invention.
Figure 18B:
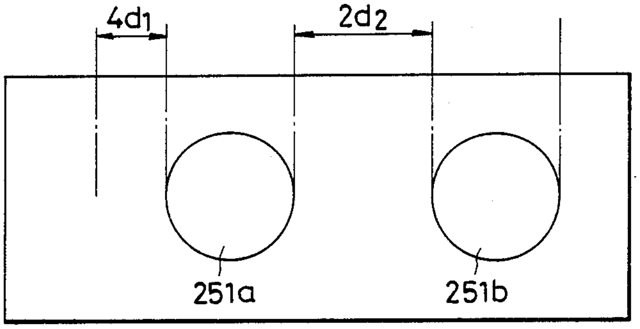

FIGS. 18A and 18B are schematic diagrams for explaining the image shifting operations according to this invention, wherein reference numerals 251a to 251c designate the images on the abovementioned original image 11, each of these images 251a to 251c being the same in size. Reference letters $d_1$ to $d_3$ designate the quantity of blank space present between the adjacent images 251a to 251c, respectively.

When the operator wants the blank space quantity $d_1$ as shown in FIG. 18A to be doubled for the reproduced image as shown in FIG. 18B, he (or she) depresses the image shifting key 237 on the operating board 22 to shift the cursor K1 to a desired position, while observing the display 21, and, when the cursor K1 reaches the desired position, he depresses the set key 235 to establish the image shifting. Subsequently, when a copy key (not shown in the drawing) is depressed, the controller 4 establishes the speed ratio between the DC scanner motor 4d (moving speed of V1) and the DC main motor 4e (rotational speed of V2) in a relationship of, for example, V1:2V2 (V1=V2 at the time of the lift-size mode), that is to say, the peripheral speed difference is made variable, to thereby emit the drive signals to the driver circuits 4f and 4g. Subsequently, when the original image scanning section 13 disposed at a distance a commences the scanning operation, the DC main motor 4e causes the photosensitive drum 16 to rotate at a rate of 2V2 until, the image position detection section 13g detects the distal end of the image 251a, whereby the scanning mirror 13c and the image position detection section 13g form the blank space quantity $2d_1$ as shown in FIG. 18B. Subsequently, the image 251a is formed in the life-size, and thereafter the DC main motor 4e causes the photosensitive drum 16 to rotate at a rate of 2V2 until the image position detection section 13g detects the rear end of the image 251a to the distal end of the subsequent image 251b, to thereby form the blank space quantity $2d_2$ as shown in FIG. 18B.

Incidentally, it is also possible to obtain the image of the original as shown in FIG. 18A from the output image as shown in FIG. 18B by reversal of the speed ratio, although explanations therefor is dispensed with.

In the following, explanations will be given in reference to FIg. 19 and FIG. 18B as to the image deletion operation according to the present invention.

Figure 19:
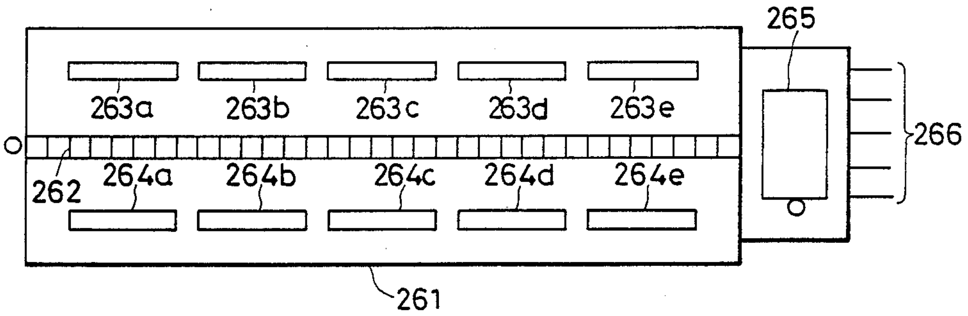
FIG. 19 is a plan view for explaining an image erasing mechanism of the present invention.

FIG. 19 is a plan view for explaining an image erasing lamp mechanism, wherein a reference numeral 261 designates a main body of the image erasing mechanism and a numeral 262 refers to a light-emitting element constituting the lamp mechanism which is constructed with, for example, LED, etc. and is disposed in parallel with the photosensitive drum 16. Reference numerals 263a to 263e and 264a to 264e represent drivers for driving the light-emitting element 262, each of which can be driven independently by the address designation by the controller 265. A reference numeral 266 denotes a connector which is connected to the controller 1. By the way, each unit is disposed on a single base plate.

Figure 20:
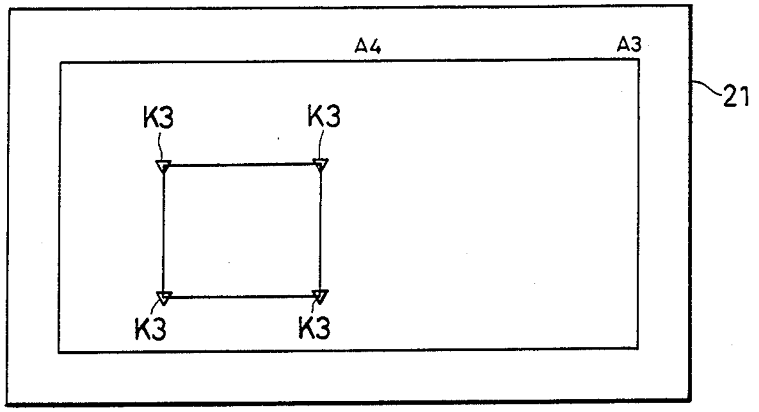
FIG. 20 is a schematic diagrams showing an example of an image display by a display means shown in FIG. 1B.

When the operator depresses the x-direction designation key 238a, the deletion mode is indicated on the display 231. At every depression of this x-direction designation key 238a, the cursor K3 moves in the x-direction. At both the starting point and the ending point within the range of the image deletion, the set key 235 is depressed. When the range designation in the x-direction is completed, the y-direction designation key 238b is depressed. At both the starting point and the ending point within the range of the image deletion in the y-direction, when the set key 235 is depressed, the image deletion area setting operation is completed, the result of which is indicated on the display 21 as shown in FIG. 20. In this instance, if the copy key is depressed, any of the desired light emitting element among those light emitting elements 262 is actuated in the image deletion area to irradiate the photosensitive drum 16, whereby it bocomes possible to delete the image 51*c* as shown in FIG. 18B.

In the following, explanations will be made in reference to FIGS. 21A and 21B as to the image forming operations including both a linear image magnification-changing operation and an image deleting operation.

Figure 21A:
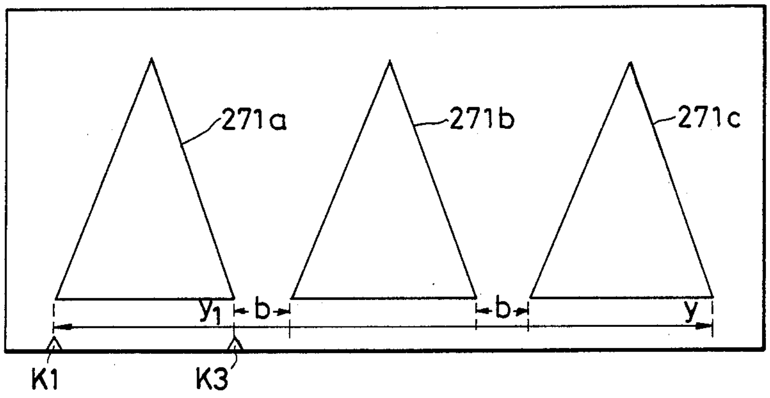
FIGS. 21A and 21B are schematic diagrams for explaining the image forming operations including the linear image magnification-changing operation and an image erasing operation.
Figure 21B:
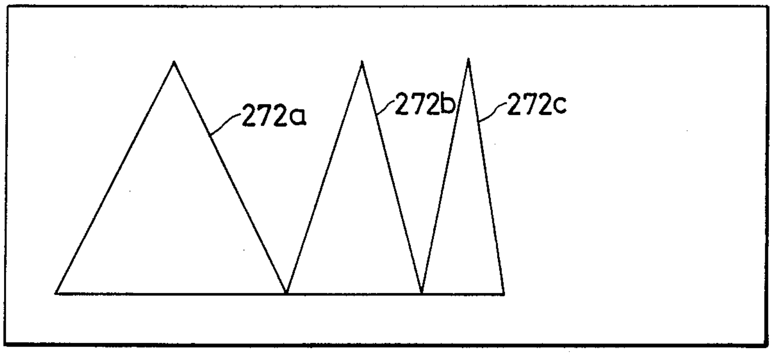

FIGS. 21A and 21B are schematic diagrams for explaining the image forming operations including both linear image magnification-changing operation and the image deleting operation, wherein reference numerals 271*a* to 271*c* designate the original images, blank space b being provided between the adjacent images. Reference numerals 272*a* to 272*c* denote the reproduced inmages, from which the blank space b between the reproduced images 272*a* and 272*b* as well as the blank space b between the reproduced images 272*b* and 272*c* are deleted, and in which the original image 271*a* is enlarged by, for example, 150%, and the original image 271*c* is reduced by, for ecample, 75%.

When the operator depresses the y-direction designation key 238*b*, while observing the display 21, the cursor K3 is moved to the starting point $y_1$ within the range of deletion in the y-direction. When the set key 235 is depressed and the quantity of breadth (blank space quantity b) to be deleted is input by the ten-key 233, the deletion designation setting is completed. In the next place, the magnification-changing mode is established by depression of the magnification-changing designation key 234; further, the magnification designation key 234 is continued to be depressed, while observing the display 21, to shift the cursor K1 up to the position of hte magnification-changing designation, where the set key 235 is depressed. Thereafter, the linear magnification-changing designation key 241 is depressed, and, at the same time, the linear magnification-changing setting key 240 is slided to thereby establish the magnification-changing ratio at, for example, 150%. When this scanning is effected for each of the original images 271*b* and 271*c*, the image deletion and the linear magnification-changing setting are completed and, when the copy key is depressed, the image position detection section 13*g* detects the original images 271*a* to 271*c* in sequence. In the meantime, the controller 4 renders the speed ratio between the DC scanner motor 4*d* (moving speed of V1) and the DC main motor 4*e* (rotational speed of V2) linearly variable at the position where the cursor K1 is held, whereby the reproduced image 271*a* as shown in FIG. 21B is formed. Subsequently, at the time instant when the original image scanning section 13*g* scans a sector corresponding to the blank space quantity b from the position as designated by the cursor K3, and this original image position detection section 13*g* detects the original image 271*b*, the DC scanner motor 4*d* is once stopped, and the charge-remover (to be described later) is actuated to thereby separate the recording paper from the photosensitive drum 16. At that time, the photosensitive drum 16 continues its ordinary rotation, after which it stops. Following this, the DC scanner motor 4*d* is driven and the original image scanning section 13 commences scanning of the original image again to thereby form a latent image of the original image 271*b* on the photosensitive drum 16. Subsequently, registration between the recording paper and the image is taken, after which the image transfer charger is again actuated to transfer the reproduced image 272*a* as shown in FIG. 21B onto the recording paper. These operations are executed in the same manner on the reproduced image 227*b*, after which all the reproduced images 272*a* to 272*c* are outputted as shown in FIG. 21B.

By the way, in the above-described embodiment of the present invention, explanations have been made as to a case wherein each mode is established by observing the prescanned image as indicated on the display 31. It should however be noted that, instead of doing this, shifting, deletion and linear magnification-changing of the image may be designated by directly operating each of the cursors K1 to K3. The display 31 may be of any type, provided that it is contructed with a dot-matrix type display medium, for which purpose there may be employed LCD, LED, EL, plasma display fluorescent display panel, etc. Furthermore, when the cursors K1 to K3 are constructed in such a manner that they may be displayed in color, their operating performance improves. It is also feasible that the image position may be detected by scanning the original image scanning section prior to formation of the reproduced image.

In the following, explanations will be given in reference to FIG. 22 as to the control operations of the controller 4 shown in FIG. 1B.

Figure 22:
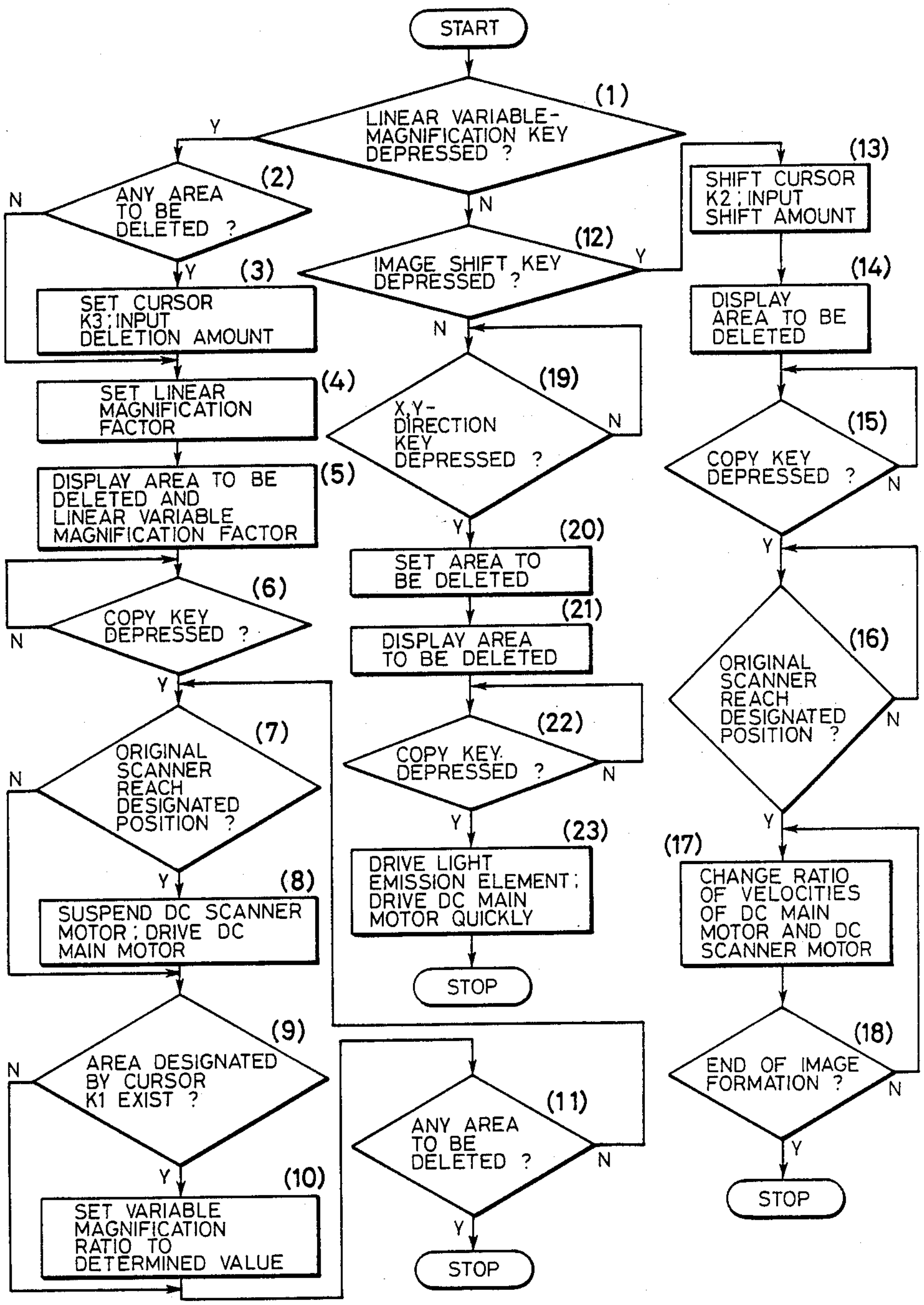
FIG. 22 is a flow chart for explaining the operations of the controller shown in FIG. 1A.

FIG. 22 indicates a flow chart for explaining the control operations by the controller 4 shown in FIG. 1B, wherein numerals (1) through (23) inclusive refer to the sequential steps of the operations.

First of all, the controller 4 judges as to whether the linear magnification-changing designation key 1 has been depressed, or not (1). If it is depressed, a judgement is further made as to whether the y-direction designation key 238*b* has been depressed, or not (that is, whether there is an area designation for the linear magnification-changing and the deletion, or not) (2); if the answer is YES, setting of the area deletion is done, i.e., setting of the cursor K3 and inputting of the quantity to be deleted are effected (3); if the answer is NO, the linear magnification-changing ratio is set by the linear magnification-changing setting key 240 (4). Following this, the area to be deleted and the linear magnification-changing ratio are indicated on the display 31 (5). Thereafter, the copy key is kept in its stand-by condition for depression a (6); upon its depression, judgement is made as to whether the original scanning section 13 has reached the position to be designated by the cursor K3, or not (7); if the answer is YES, the DC scanner motor 4*d* to drive the original image scanning section 13 is stopped, and the recording paper is separated, after which the DC main motor 4*e* is driven (8). Subsequently, a judgement is made as to whether there is an area to be designated by the cursor K1, or not (9); if the answer is YES, the controller 4 establishes the magnification-changing ratio of the DC main motor 4*e* and the DC scanner motor 4*d* at the designated magnification ratio (10); on the other hand, if the answer is NO, a judgement is made as to whether there exists the cursor K3 for designating the area to be deleted, or not (11). Throughout these judgements, if the answer is YES, the control is terminated, and, if the answer is NO, the operational sequence returns to the step (7) to repeat the same control.

On the other hand, if the result of the judgement at the step (1) is NO, a further judgement is made as to whether the image shifting key 37 has been depressed, or not (12); if the answer is YES, the cursor K2 is moved to the shift position, and, at the same time, the shifting quantity is inputted through the ten-key 33 (13) to display the area to be deleted (14). Following this, the copy key is kept in its stand-by state for depression (15) so that it may wait until the original image scanning section 13 reaches the position to be designated by the cursor K2 (16). Subsequently, the controller 4 renders the magnification-changing ratio of the DC main motor **4*e* and the DC scanner motor 4*d*** variable in accordance with the shifting quantity (17). In the next place, a judgement is made as to whether the image formation in the area to be designated by the cursor K2 has been terminated, or not (18); if the answer is YES, the control is terminated; and if the answer is NO, the operational sequence returns to the step (17) to repeat the same operation.

On the other hand, from the judgement at the step (12), if the answer is NO, both x-direction designation key **38*a* and y-direction designation key 38*b* are kept in their stand-by state for depression (19); as soon as they are depressed, there is effected establishment of the area to be deleted (20) and the area to be deleted is displayed (21). Following this, the copy key is kept in its stand-by state for depression (22); as soon as it is depressed, the controller 4 actuates the light-emitting element 62 in the area to be deleted, and, at the same time, the DC main motor 4*e*** is driven abruptly to complete the control (23).

Figures 23A, 23B:
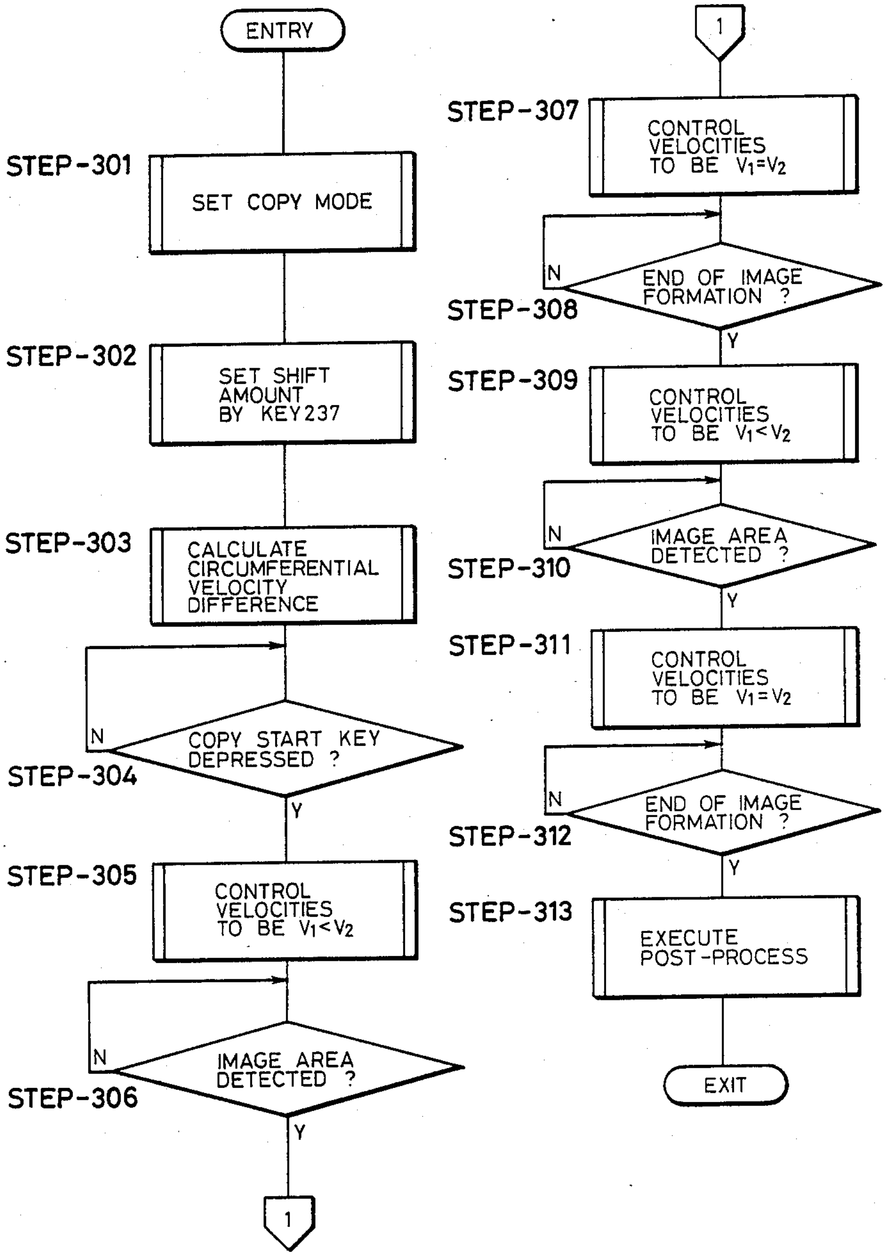
FIGS. 23A and 23B are also flow charts for explaining the other process operations.

In the following, explanations will be made as to the image shifting function. As to the area deletion and the linear magnification-changing, no explanation will be made, because they have already been made in the foregoing. This image shifting makes it possible to shift the image position to the left end by adjustment of the timing at the time of the image formation for the purpose of providing a binding margin at the left side of the copy. The shifting quantity can be arbitrarily determined by the operator in his (or her) operation on the keyboard switch. In this particular embodiment, the function is applied to the image shifting in utilization of the difference in the peripheral speed between the optical system and the drum system. The image shifting will be explained in the following with reference to the flow chart as shown in FIGS. 23A and 23B.

Step-301: the magnification-changing, area designation, area deletion designation, number of reproduction sheet, and so forth are set.

Step-302: the shifting quantity is set by the key 237 (in this flow chart, explanations will be made in reference to FIG. 18A and 18B); the starting position of the image is determined by shifting of the cursor K2 upon depression of the key 237; in the case of effecting the magnification-changing of the image, the area designation is first made, and then the magnification-changing ratio is designated by the key 240.

Step-303: the arithmetic operation of the peripheral speed difference is done on the basis of the shifting quantity at Step-302.

Step-304: a judgement is made as to whether the copy start key has been depressed, or not.

Step-305: the peripheral speed of the drum V2 is made four times as high as the peripheral speed V1 of the scanner to thereby expand the left margin in the copy four times as large as that ot the original image.

Step-306: detection of the image is carried out by the image sensor **13*g* in FIG. 2**; incidentally, it should be noted that the detection of the image position is exemplified in this embodiment as being done on real time, but this may also be done by prescanning so as to recognize the position in advance.

Step-307: the image detection having been completed, the peripheral speed of V1 and V2 is controlled in a relationship of V1=V2, since the reproduction of the image has been set to be done in the life size.

Step-308: a judgement is made as to whether the image area has been formed, or not.

Step-309: the peripheral speed V2 of the drum is controlled to be twice as high as that of the peripheral speed of the scanner V1, since the margin is to be expanded twice as large as that of the original image.

Step-310: a judgement is made as to whether the subsequent image area has been reached, or not.

Step-311: the peripheral speed is controlled to be constant since the image formation is to be done in life size.

Step-312: a judgement is made as to whether the subsequent image area has been formed, or not.

Step-313: the post-process after formation of the reproduced image is effected; in the case of making a plurality of copies, this post-process cycle is repeated.

FIG. 6 illustrates an example of an application, in which the space interval between the adjacent images is expanded by the deletion of one image in the original. It should however be noted that, in the case of narrowing the space interval or bringing the images together without a space interval between them, the difference in the peripheral speed between the scanner and the drum is utilized as is the case with the expansion of the space interval.

In the following, explanations will be given in reference to FIGS. 24 et seq. as to the clipping image forming operations according to the fourth embodiment of the present invention.

Figure 24:
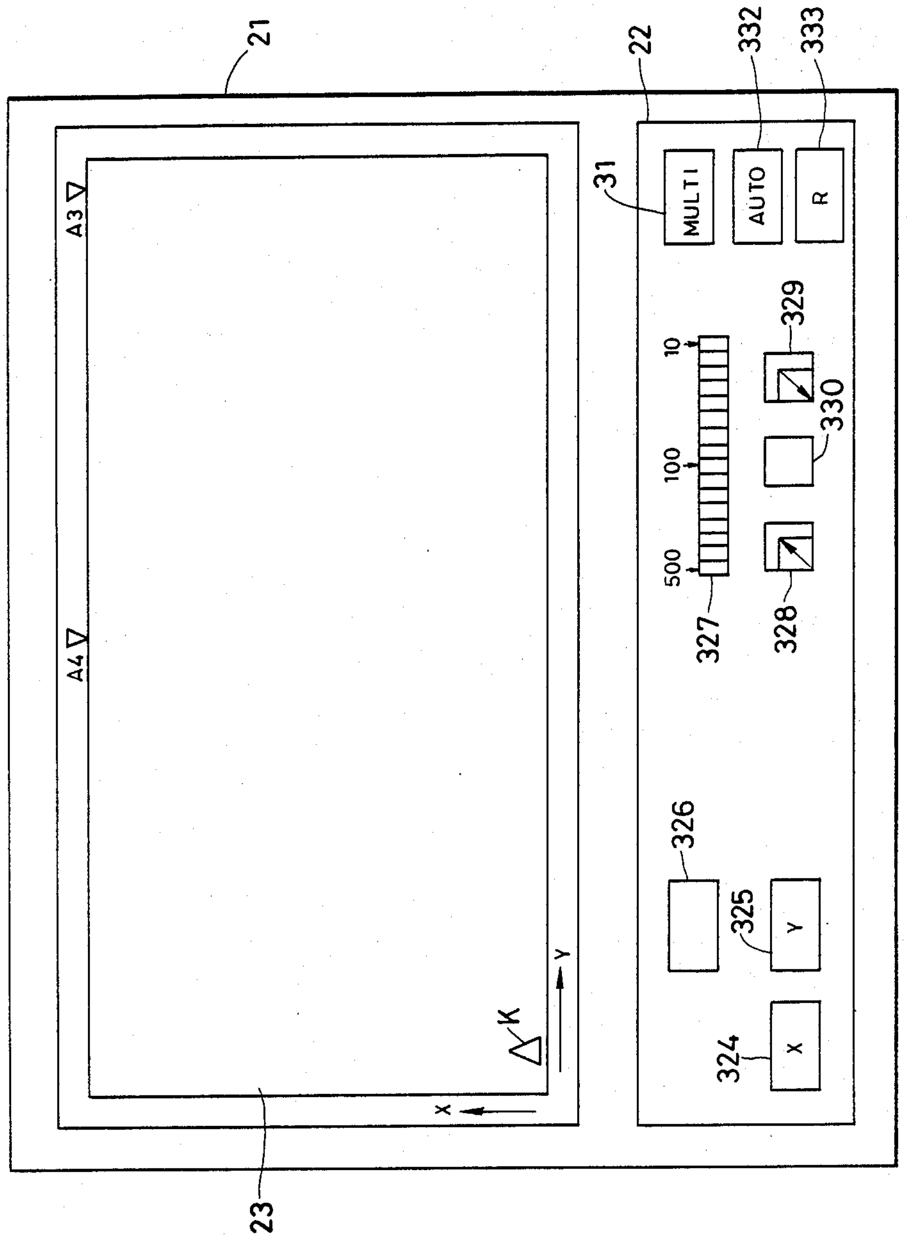

FIG. 24 is an enlarged plan view for explaining the operating section including the display means **4*a* and the switching means 4*c* as shown in FIG. 1B, wherein a reference numeral 21 designates an operaitng board comprising an operating section 22, a display 23, and so on. A reference numeral 324 denotes an x-direction designation key which functions as the image designating means to designate the area of the cutting or clipping image in the x-direction. A numeral 325 refers to a y-direction designation key which functions as the image designating means to designate the area of the clipping image in the y-direction. A numeral 326 refers to a cursor setting key, by the depression of which the controller 4 receives the cursor K as moved in the respective directions by depression of the x-direction designation key 324 or the y-direction designation key 325, and indicated on the display 23. A reference numeral 327 represents a magnification ratio indicator constructed, for example, with LEDS. At every depression of a scale-enlarging key 328 or a scale-recuding key 329, the LED's light up in succession, and the magnification as displayed by the magnification setting key 330 is thus established. A reference numeral 331 designates a multiple-key for designating the clipping image forming mode. A numeral 332 refers to an automatic-key, by the depression of which image forming numbers to be determined from the size of the clipping image as designated by the x-direction designation key 324 or the y-direction designation key 325 and the size of the recording paper are automatically established. A reference numeral 333 designates a reset key which functions to clear the clipping image forming mode and establish the ordinarly life-size mode. Incidentally, it should be noted that explanations for the ten-key to set the number of copy, the copy key, and the stop key are dispensed with. It should be understood that a size index for recognizing the size of the original image is marked on the outer frame of the display 23**.

Figure 25A:
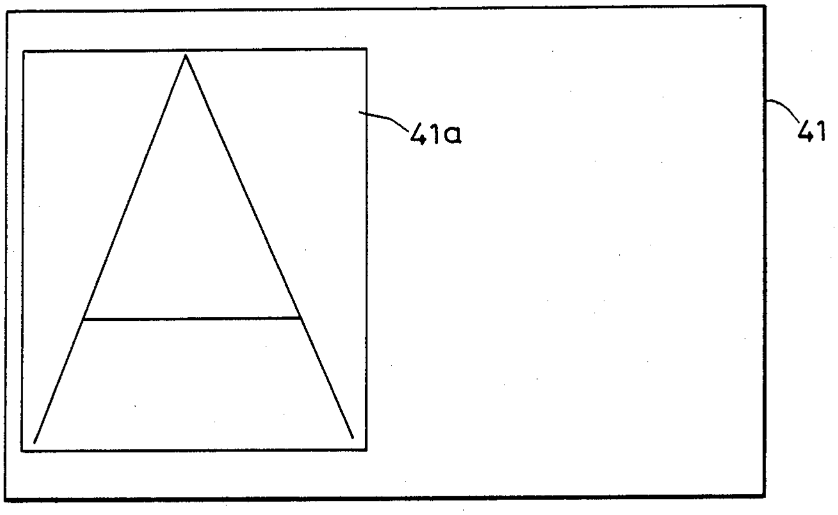
FIGS. 25A and 25B are schematic diagrams for explaining the image forming operations by clipping according to the present invention.
Figure 25B:
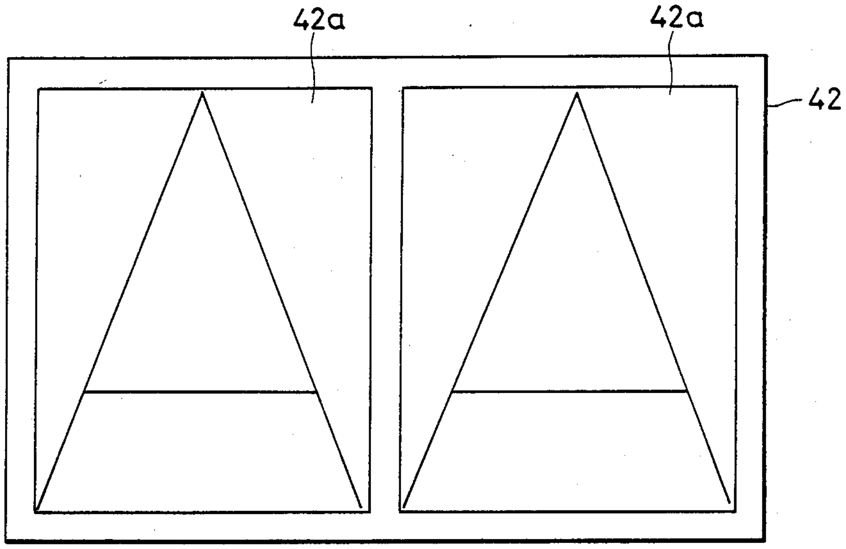

FIGS. 25A and 25B are schematic diagrams for explaining the cutting image forming operations according to the present invention. In FIG. 25A, a reference numeral 41 designates an original image in A3-size, for example, which is shown to have an original image 41*a* (e.g., a letter "A") drawn in an area corresponding to an A4-size of paper. In FIG. 25B, a numeral 42 refers to an image-reproduced copy, in which two reproduced images 42*a*, each being of A4 size, have been formed on the recording paper of A3 size, for example.

Figure 26:
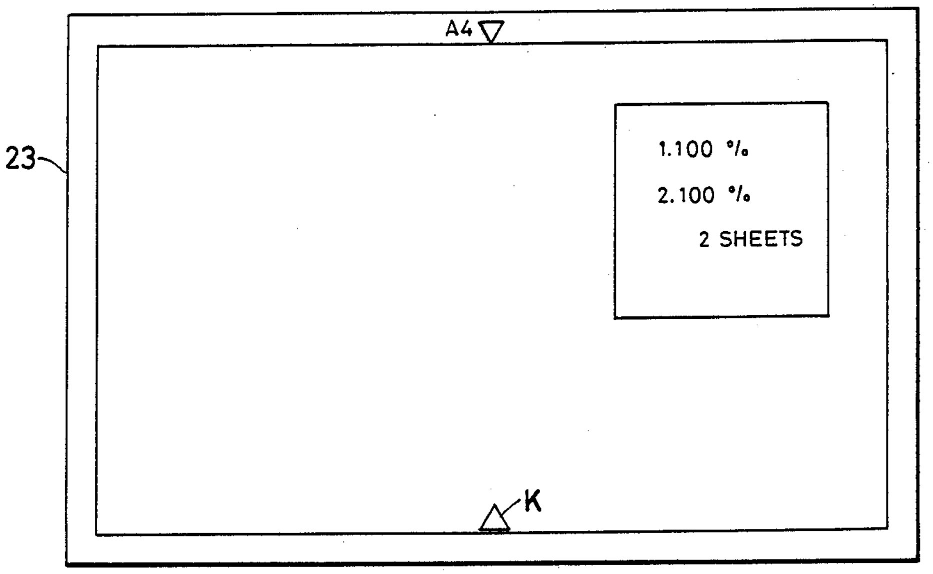
FIG. 26 is a schematic diagram showing an example of image display shown in FIG. 24.

First of all, the original image 41 shown in FIG. 25 is placed on the image original placement table 12, after which the y-direction designation key 325 is depressed to move the cursor K to the A4 position with the size index as the reference, and then the cursor designation key 326 is depressed, whereby the original image 41*a*, i.e., the cutting image has been designated. Subsequently, while observing the magnification indicator 327, either the scale-enlarging key 328 or the scale-reducing key 329 is depressed to light up the LED at a desired magnification ıatio, e.g., the life-size posiiton, followed by depression of the magnification setting key 330. Then, the number of copies (e.g., "2") is input by the ten-key (not shown), whereupon the number of copies is displayed on the display 23 as shown in FIG. 26. By the way, it may also be feasible that the sequence of operations is displayed on the display 23 so as to inform the operator of the operating sequence. When the copy key (not shown) is depressed, the controller 4 begins to control the DC scanner motor 4*d* and the Dc main motor 4*e*, whereby the original image scanning section 13 the photosensitive drum 16 are driven at an equal speed, whreeby a life sized latent image is formed on the photosensitive drum 16. Following this, a developed toner image is transferred onto the recording paper 22 to be conveyed, after which the exposure lamp is irradiated onto the recording paper 42 to separate it from the photosensitive drum 13, and, at the same time, the paper conveying system is stopped to keep the original image scanning section in its stand-by state for the scanning back operation, and then the scanning of the image original is resumed in the same manner as described in the foregoing. Thereafter, registration of the image is carried out to resume the image transfer onto the recording paper 42 which has thus far been separated from the drum, thereby completing formation of the two reproduced images 42*a* on the recording paper 42 as shown in FIG. 25B.

Further explanations will be given in the following in reference to FIGS. 27A and 27B as to the cutting image forming operations.

Figure 27A:
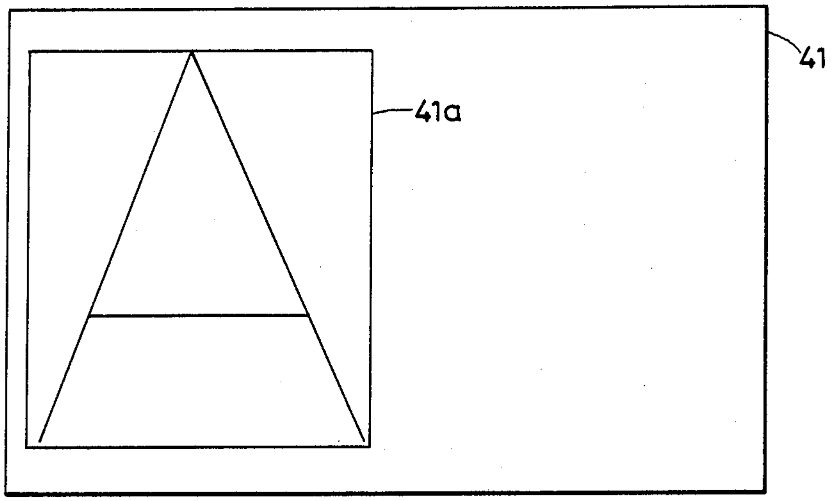
FIGS. 27A and 27B are schematic diagrams for explaining the image forming operations by cutting according to the present invention.
Figure 27B:
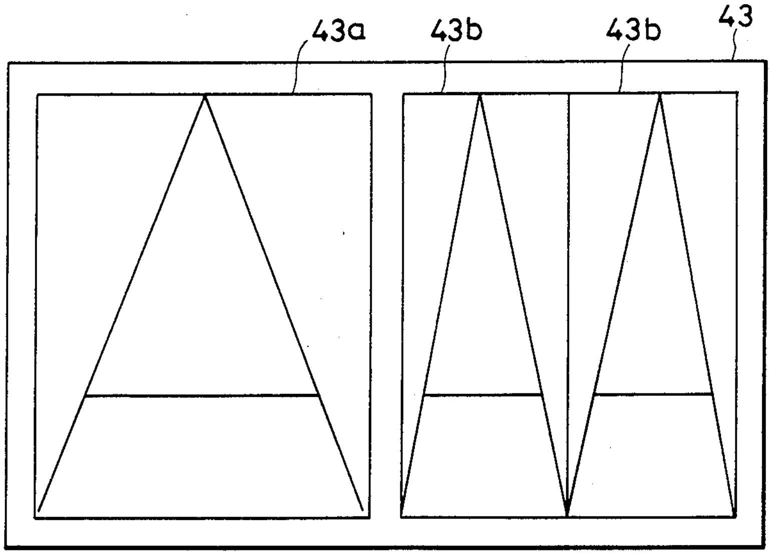

FIGS. 27A and 27B is a schematic diagram for explaining the cutting image forming operations, in which FIG. 27A is the same as the original image 41 shown in FIG. 25A. In FIG. 27B, a reference numeral 43 designates the recording paper which is shown to contain therein a life size reproduced image 43*a* and the reproduced images 43*b* and 43*c*, each of which has been reduced in scale by a half.

First of all, the original image 41 shown in FIG. 27A is placed on the original image placement table 12, after which the y-direction designation key 25 is depressed to shift the cursor K to the A4 position with the size index as the reference, and the cursor designation key 26 is depressed, whereby the original image 41*a*, i.e., the cutting image, has been designated. Subsequently, while observing the magnification indicator 327, either the scale-enlarging key 328 or the scale-reducing key 329 is depressed to light up the LED at a desired magnification ratio (e.g., at the position of the life size); after this, when the magnification ratio setting key 330 is depressed, setting of the cutting image (i.e., reproduced image 43*a*) is completed. Following this, while observing the magnification indicator 327, the scale-reducing key 329 is depressed to light up the LED at a desired magnification ratio (e.g., 50% scale-reduction) and then the magnification setting key 330 is depressed, whereupon setting of the second reproduced image 43*b* to be formed on one and the same recording paper 43 is completed. Subsequently, while observing the magnification indicator 327, the scale-reducing key 329 is depressed to light up the LED at a desired magnification ratio (e.g., 50% scale-reduction) and then the magnification setting key 330 is depressed, whereupon setting of the third reproduced image 43*b* to be formed on one and the same recording paper 43 is completed. When these various settings have been completed and the number of copies (e.g., "5") is inputted, the copy mode is flicker-displayed on the display 23.

When the copy key is depressed, the controller 4 begins to control the Dc scanner motor 4*d* and the DC main motor 4*e*, whereby the original image scanning sectio 13 is driven, the photosensitive drum 16 is driven at an equal speed, and a life size latent image is formed on the photosensitive drum 16. The subsequent steps are as follows: the toner image as developed is transferred onto the recording paper 42 to be conveyed; then, the exposure lamp is irradiated onto the recording paper 42 to separate it from the photosensitive drum 16; the paper conveying system is stopped to maintain the original image scanning section in its stand-by state for scanning-back; the speed ratio between the DC scanner motor and the DC main motor 4*e* is set at 2:1 to carry out scanning of the original image and formation of the latent image thereof in the same manner as described in the foregoing; corona discharge is applied to the recording paper which has thus far been separated from the photosensitive drum to thereby transfer the toner image thereon, and to form the reproduced image 43*b* on the recording paper 43; again the recording paper 43 is separated from the photosensitive drum 16 by removing charge between them; and the recording paper is stopped at its current position. In this instance, the original image scanning section 13 is kept in its stand-by state for the scanning back, the image process for forming the reproduced image 43*b* is repeated, and, after the image-fixing under heat, the image-transferred paper is placed on the paper-discharging tray (not shown) to complete the entire controls. By the way, it should be noted that the photosensitive drum 16 continues its rotation even after separation of the recording paper 43 therefrom (i.e., it is idling) to prepare for the subsequent image formation. In this way, it is possible to form on one and the same recording paper 43 only those images on the original designated as the cutting image in life-size or magnification-changed size, as desired.

Figure 29A:
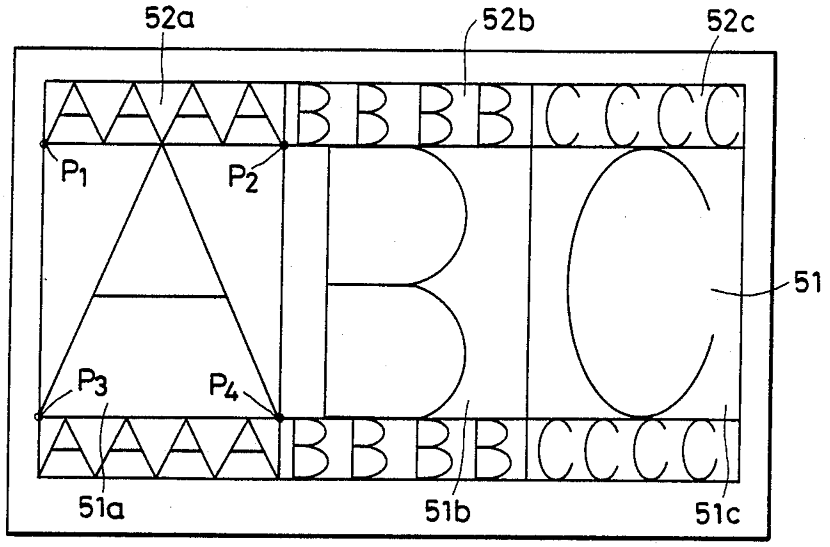
FIGS. 29A and 29B are schematic diagrams for explaining the image forming operations by clipping according to the present invention.
Figure 29B:
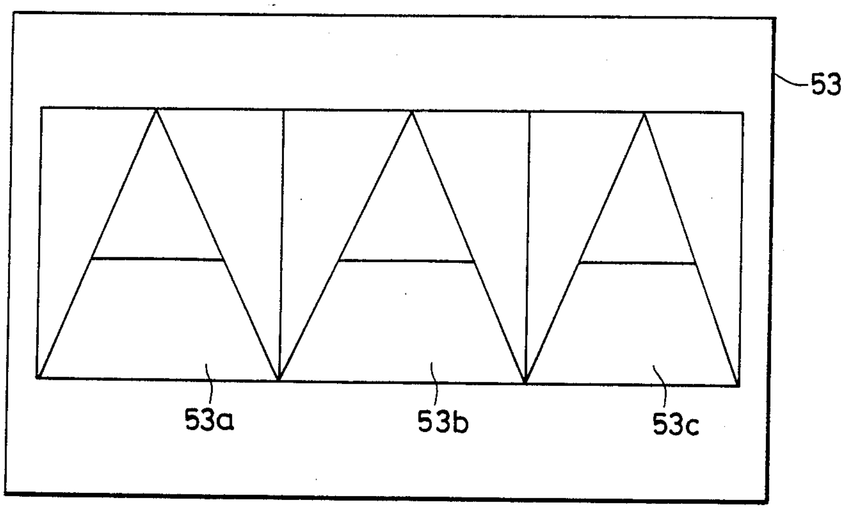

Referring now to FIGS. 29A and 29B, the clipping image forming operations according to the present invention will be explained. FIGS. 29A and 29B are schematic diagrams for explaining the clipping image forming operations according to the present invention. In FIG. 29A, a reference numeral 51 designates an original in A3-size, for example, which shows a case of the original images 51*a* to 51*c* and 52*a* to 52*c* having been drawn, and in which the area for the clipping image original 51*a* is shown to have been designated by pointers P1 to P4 (these points are not indicate actually). In FIG. 29B, a numeral 53 refers to the recording paper which shows a case of three reproduced images 53*a* to 53*c* having been formed thereon.

Figure 28:
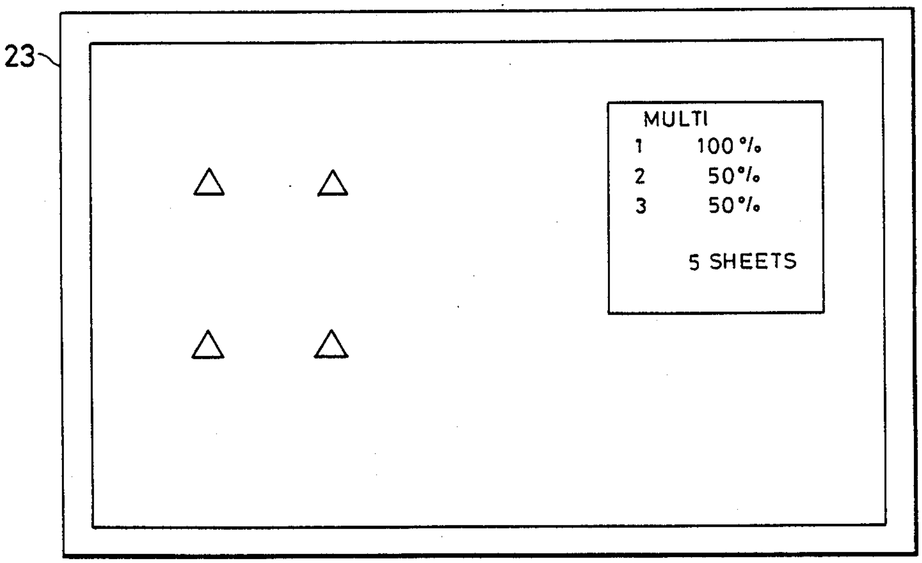
FIG. 28 is a schematic diagram showing an example of the display shown in FIG. 24.

First of all, while observing the display 23, the multiple-key 31 and the automatic-key 332 are depressed sequentially to desigante the clipping image forming mode. Then, in order to clip the image enclosed by the pointers P1 to P4 as shown in FIG. 29A, i.e., in order to clip the image original 51*a*, the x-direction designation key 324 is depressed to shift the cursor K to a position designated by the pointer P3, followed by depression of the cursor designation key 326. Thereafter, the x-direction designation key 324 is further depressed to shift the cursor K to a position designated by the pointer P1, followed by depressioin of the cursor designation key 326. Following this, the y-direction designation key 325 is depressed to shift the cursor K to a position designated by the pointers P2 and P4 and then the cursor designation key 326 is depressed, whereupon the area to be clipped is displayed on the display 23 as shown in FIG. 28. Here, when a desired image forming magnification-changing ratio is set by depression of the scale-enlarging key 328 or the scale-reducing key 329 (e.g., the life-size (100%)) and then the magnification setting key 330 is depressed, the controller 4 calculates the number of images which can be reproduced on one and the same recording paper 53, and automatically sets such a calculated number. As shown in FIG. 29A, in case the image original 51*a* has a size ⅓ as small as that of the A3-size, for example, and the recording paper is also in A3-size, the number of the images to be reproduced is set as "3". Here, when the copy key (not shown) is depressed, the controller 4 sends out the driving instructions to the DC scanner motor for driving the image original scanning section 13 and the DC main motor 4*e* for driving the photosensitive drum 16, and, at the same time, sends out to the lamp mechanism (not shown) the erasing instructions to cause the exposure light to irradiate those areas other than the image original 51*a* to prevent formation of the latent image. Subsequently, when the first image formation is effected on the recording paper 53, the charge-removing lamp is lighted to separate the recording paper 53 from the photosensitive drum 16, after which it stops operation. At this instant, the photosensitive drum 16 continues its idle rotation to be ready for the subsequent image formation. Simultaneously with this idle-rotation of the drum, the image original scanning section 13 scans back to its home position (to be described later) in preparation for the subsequent scanning of the image original. Then, in the same manner as described in the foregoing, the second and the third image formation is executed to obtain the reproduced images 53*a* to 53*c* as shown in FIG. 29B. Incidentally, the image to be clipped is not limited to the image original 51*a*, but any part of the original image 51 as designated in an arbitrary range may be output in the same manner. Further, when a desired magnification is designated by depression of the scale-enlarging key 328 or the scale-reducing key 329, it is possible to output on one and the same recording paper the same clipped image containing the magnification-changed images.

Figure 30A:
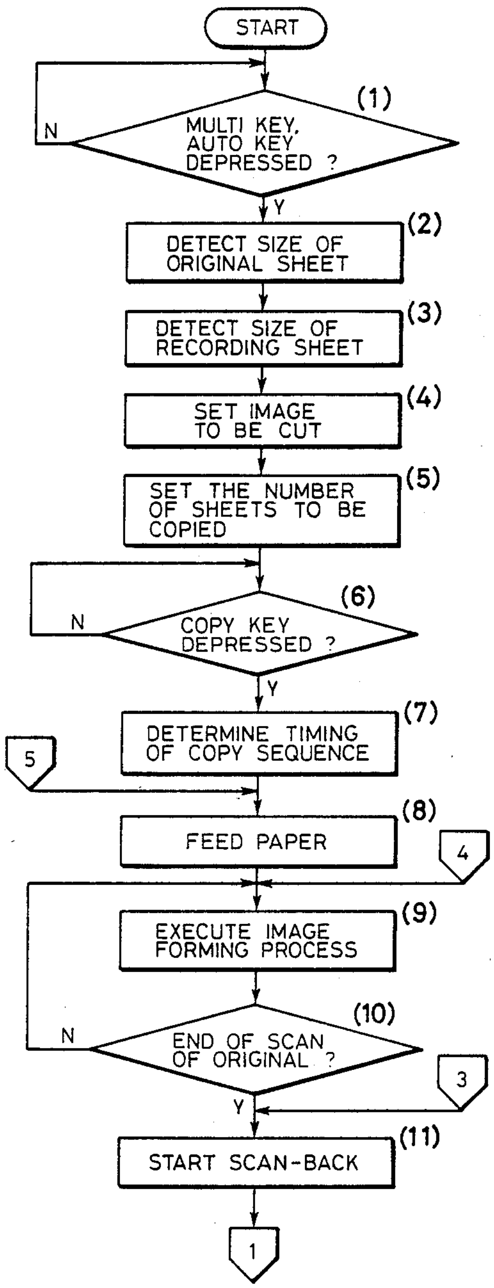
FIGS. 30A, 30B and 30C are respectively flow charts for explaining the image forming operations by the image forming apparatus shown in FIG. 29.
Figure 30B:
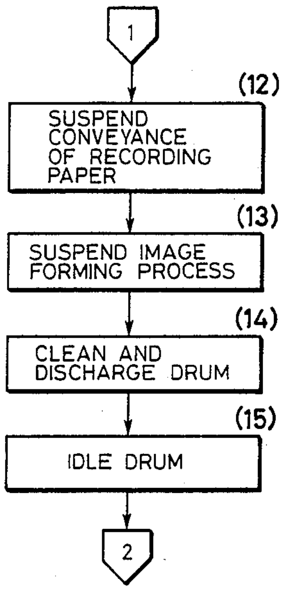
Figure 30C:
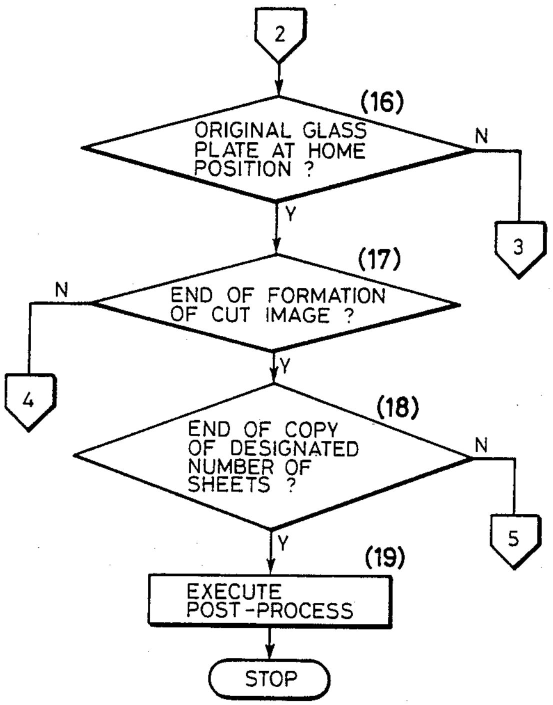

In the following, the image forming operations by the image forming apparatus as shown in FIG. 8 will be explained in reference to FIGS. 30A, 30B and 30C which are the flow charts for explaining the image forming operations of such image forming apparatus. In these flow charts, numerals (1) to (19) refer to the steps for the sequence operations.

At first, the multiple-key 331 and the automatic-key 332 are kept in their stand-by state (i.e., stand-by for setting of the clipping image forming mode) (1); as soon as the clipping image forming mode has been set, the size of the image original is detected by an input from a photosensor or a manual switch (not shown) (2); then, the controller 84 detects the size of the recording paper by the paper size signal to be inputted by actuation of the microswitch provided in the apparatus main body 61 due to a projection provided in the paper feeding cassette 62 (3); subsequently, the range designation, magnification-changing ratio, and so forth of the clipping image are inputted from the operating section 21 to thereby set the clipping image (4); the controller 84 establishes the number of the clipping images that can be formed on the recording paper (i.e., the number of times for the image formation) on the basis of the size of the clipping image, the detected size of the recording paper, magnification-changing ratio, and so forth (5); in the next place, the copy key is kept at its stand-by state for depression (6); as soon as the copy key is depressed, the copy sequence timing such as magnification-changing, etc. (i.e., timing for the main motor 76, the scanner motor 80, etc.) is determined (7); subsequently, the paper-feeding roller 63 is driven to feed the recording paper P from the paper-feeding cassette 62 to a position of the registration roller 64, where the forwarding of the recording paper P is once suspended (8); following this paper-feeding, the image forming process is executed, in more detail, the photosensitive drum 67 is uniformly charged, the erasure lamp 75 illuminates those areas other than the clipping image area, followed by development of the latent image, transfer of the developed toner image, cleaning and charge-removing of the photosensitive drum (9); then, a judgement is made as to whether the image original scanning is completed, or not (10); if the answer is NO, the operational sequence returns to the step (9), and if, on the other hand, the answer is YES, the image original placement table 81 is caused to start its scanning back movement toward its home position (11); at this instant, the charge-removing lamp 68 irradiates the photosensitive drum 67 to separate the recording paper P from the photosensitive drum, and, at the same time, the recording paper conveying system is stopped (12) to thereby temporarily cease the image forming process; following this, cleaning and charge-removing of the photosensitive drum 67 are effected (14), after which the photosensitive drum 67 is caused to perform its idle rotation (15) so as to prepare for the subsequent image forming process; next, a judgement is made as to whether the image original placement table 81 has scanned back to its home position, or not (16); if the answer is NO, the operational sequence returns to the step (11), and, if it is YES, a further judgement is made as to whether formation of the clipping image has been completed, or not (17); if the answer is NO, the operational sequence returns to the step (9), and, if it is YES, a further judgement is made as to whether the total number of copies as set have all been made, or not (18); if the answer is NO, the operational sequence returns to the step (8), and, if it is YES, post-rotational process of the photosensitive drum 67, i.e., cleaning of the photosensitive drum 67 and positioning of the driving system are carried out, thereby completing the entire controls in preparation for the susequent image formation (19).

Figure 31A:
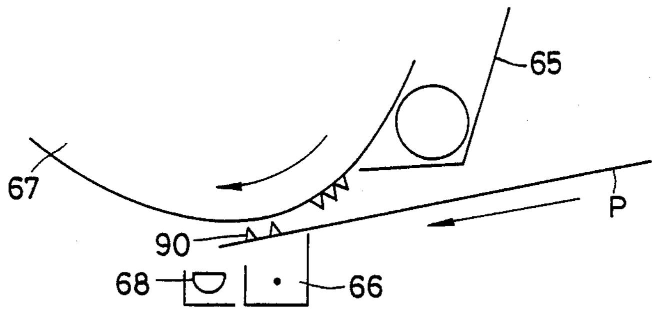
FIGS. 31A, 31B and 31C are respectively schematic diagrams for explaining the image forming process of the clipped images.
Figure 31B:
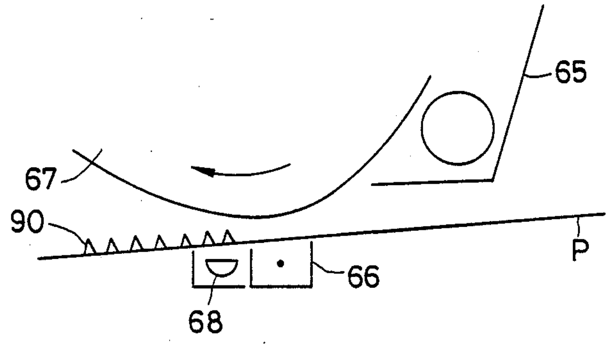
Figure 31C:
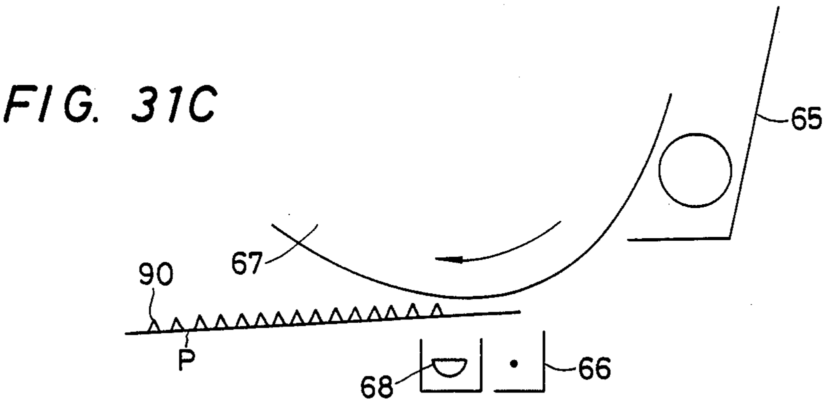

FIGS. 31A, 31B and 31C are schematic diagrams for explaining the image forming process for the clipping image, wherein those members which are identical with those as shown in FIG. 8 are designated by the same reference numerals. FIG. 31A shows the relationship between the toner 90 and the recording paper P at the instant of its starting the first image transfer operation. FIG. 31B shows the relationship between the toner 90 and the recording paper P at the instant of its completing the first image transfer. FIG. 31C shows the relationship between the toner 90 and the recording paper P at the instant of its completing the second image transfer.

As is apparent from FIG. 31A, when the first image transfer of the clipping image is effected on the recording paper P, the charge-removing lamp 68 irradiates the recording paper P, as shown in FIG. 31B, to separate the recording paper P from the photosensitive drum 67, and then stops its operation. At that time, the recording paper P in its stopped state and the photosensitive drum 67 in its rotating state come into contact with each other. At this instant, with a view to avoiding disturbance in the toner image on the recording paper, a vacuum fan or the like (not shown) are driven to attract the recording paper P onto the drum, or the image transfer corona is intensified to hold the recording paper P on the drum.

Subsequently, the second image formation of the clipping image is carried out. As shown in FIG. 31C, the recording paper P which has completed the image forming process is conveyed. In this manner, the image transfer to the recording paper P and the charge-removal from the drum are repeated to thereby form the clipped image on one and the same recording paper P.

Although, in the foregoing preferred embodiments of the present invention, explanations have been made as to the case wherein the size of the image original is designated by the manual operation to establish the number of the clipping images, it may also be feasible that, depending on necessity, the size of the image original be detected by providing a photosensor at a predetermined position beneath the image original placement table to carry out pre-scanning for the size detection prior to the image forming process. Further, in the foregoing embodiments, explanations have been given as to the case of forming the latent image on the rotation photosensitive drum 67; such photosensitive member, however, may be in a belt-form. Furthermore, in the case of the recording by the thermal printing, the magnification-changing can be effected by varying the conveying speed of the image transfer paper. Moreover, the magnification-changing in the principal scanning direction can be done by varying the number of the reading image data. In addition, it goes without saying that the present invention is readily applicable to an image forming apparatus capable of printing images on both surfaces of the recording paper, and provided with an intermediate tray. In this instance, the recording paper is conveyed in such a manner that one and the same image forming surface may always face upward until the entire clipping images are printed thereon.

What is claimed is:

1. An image recording apparatus, comprising:

means for recording an image;

means for setting a linear magnification mode of said apparatus; and means for controlling said recording means in accordance with said setting means so that parts of an image may be recorded in one recorded image at gradually varying magnification ratios, respectively.

2. An apparatus according to claim 1, wherein said recording means records an original image, and said control means controls said recording means in accordance with said setting means so that one part of said original image may be enlarged/reproduced at each of gradually varying magnification ratios and so that images reproduced at the gradually varying magnification ratios may be formed in one recorded image.

3. An apparatus according to claim 1, wherein said recording means records an original image, and said control means controls said recording means in accordance with said setting means so that respective parts of said original image may be enlarged/reduced at gradually varying magnification ratios, respectively, and so that images reproduced at the ratios may be formed in one recorded image.

4. An apparatus according to claim 1, 2 or 3, wherein said gradually varying magnification ratios are stepwisely changed.

5. An apparatus according to claim 1, 2 or 3, wherein said gradually varying magnification ratios are changed for each designated area.

6. An apparatus according to claim 1, 2 or 3, wherein siad gradually varying magnification ratios are determined on the basis of a size of an original and a size of a reproduced image.

7. An image reproducing apparatus, comprising:

means for reproducing an original image;

means for designating a plurality of parts of an area in an original image; and means for controlling said reproducing means so that each of the parts designated by said designating means may be reproduced in one image at respectively different magnification ratios.

8. An apparatus according to claim 7, wherein said magnification ratios are changed for each designated area.

9. An apparatus according to claim 1, 2, 3 or 7, further comprising another means for setting a predetermined magnification mode to enlarge and/or reduce an original image at a predetermined magnification ratio.

10. An apparatus according to claim 1, 2, 3 or 7, further comprising means for shifting a designated part of an image.

11. An apparatus according to claim 1, 2, 3 or 7, further comprising means for deleting a designated part of an image.

* * * * *

UNITED STATES PATENT AND TRADEMARK OFFICE

CERTIFICATE OF CORRECTION

PATENT NO. : 4,839,699

DATED : June 13, 1989

INVENTOR(S) : MASAO HOSAKA, ET AL.

It is certified that error appears in the above-identified patent and that said Letters Patent is hereby corrected as shown below:

Title page:

IN [56] REFERENCES CITED

Insert, --Attorney, Agent or Firm--Fitzpatrick, Cella, Harper & Scinto--.

COLUMN 3

Line 24, "diagrams" should read --diagram--.

COLUMN 4

Line 40, "switching means, 4," should read --switching means 4c,--.

Line 42, "4 to be" should read --4,-- and "means" should read --means,--.

COLUMN 5

Line 33, "unity magnification (unity mag-" should read --unity magnification.--.

Line 34, "nification)." should be deleted.

COLUMN 8

Line 16, "A judgement" should read --Step-203: a judgement--.

Line 24, "The number" should read --Step-204: the number--.

Line 25, "A judgement" should read --Step-205: a judgement--.

UNITED STATES PATENT AND TRADEMARK OFFICE
CERTIFICATE OF CORRECTION

PATENT NO. : 4,839,699

DATED : June 13, 1989

INVENTOR(S) : MASAO HOSAKA, ET AL.

It is certified that error appears in the above-identified patent and that said Letters Patent is hereby corrected as shown below:

COLUMN 8

Line 28, "A determination" should read --Step-206: a determination--.
Line 44, "A judgement" should read --Step-209: a judgement--.
Line 60, "A judgement" should read --Step-212: a judgement--.

COLUMN 12

Line 8, "raio" should read --ratio--.

COLUMN 15

Line 67, "nad" should read --and--.

COLUMN 16

Line 21, "lift-size mode)," should read --life-size mode),--.

COLUMN 17

Line 20, "inm-" should read --im- --.
Line 39, "hte" should read --the--.

COLUMN 18

Line 49, "depression a (6);" should read --depression (6);--.

UNITED STATES PATENT AND TRADEMARK OFFICE
CERTIFICATE OF CORRECTION

PATENT NO. : 4,839,699

DATED : June 13, 1989

INVENTOR(S) : MASAO HOSAKA, ET AL.

It is certified that error appears in the above-identified patent and that said Letters Patent is hereby corrected as shown below:

COLUMN 20

Line 59, "scale-recuding" should read --scale-reducing--.

COLUMN 21

Line 4, "ordinarly" should read --ordinary--.
Line 30, "posiiton," should read --position,--.
Line 42, "whreeby" should read --whereby--.
Line 47, "photosensitive drum 13," should read --photosensitive drum 16,--.

COLUMN 22

Line 32, "Dc" should read --DC--.

COLUMN 25

Line 56, "rotation" should read --rotating--.

UNITED STATES PATENT AND TRADEMARK OFFICE
CERTIFICATE OF CORRECTION

PATENT NO. : 4,839,699
DATED : June 13, 1989
INVENTOR(S) : MASAO HOSAKA, ET AL.

It is certified that error appears in the above-identified patent and that said Letters Patent is hereby corrected as shown below:

COLUMN 26

Line 35, "wisely" should read --wise--.
Line 40, "siad" should read --said--.

Signed and Sealed this

Seventeenth Day of September, 1991

*Attest:*

HARRY F. MANBECK, JR.

*Attesting Officer*

*Commissioner of Patents and Trademarks*